US006674436B1

(12) United States Patent
Dresevic et al.

(10) Patent No.: US 6,674,436 B1
(45) Date of Patent: Jan. 6, 2004

(54) METHODS AND APPARATUS FOR IMPROVING THE QUALITY OF DISPLAYED IMAGES THROUGH THE USE OF DISPLAY DEVICE AND DISPLAY CONDITION INFORMATION

(75) Inventors: Bodin Dresevic, Bellevue, WA (US); William Hill, Carnation, WA (US); Gregory Hitchcock, Woodinville, WA (US); Leroy B. Keely, Portola Valley, CA (US); John C. Platt, Bellevue, WA (US); J. Turner Whitted, Pittsboro, NC (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/364,649

(22) Filed: Jul. 30, 1999

Related U.S. Application Data

(60) Provisional application No. 60/118,087, filed on Feb. 1, 1999.

(51) Int. Cl.[7] .............................. G09G 5/26; G06T 3/40
(52) U.S. Cl. ........................ 345/472; 345/3.1; 345/667
(58) Field of Search ................................. 345/112, 327, 345/88, 418, 581, 471, 472, 472.1, 472.2, 745, 1.1, 3.1–3.4, 10, 87, 667–671

(56) References Cited

U.S. PATENT DOCUMENTS

| 4,136,359 | A | 1/1979 | Wozniak ........................ 358/17 |
| 4,217,604 | A | 8/1980 | Wozniak ........................ 358/16 |
| 4,278,972 | A | 7/1981 | Wozniak ........................ 340/703 |
| 5,057,739 | A | 10/1991 | Shimada et al. ........... 313/477 R |
| 5,122,783 | A | 6/1992 | Bassetti, Jr. ................. 340/701 |
| 5,153,575 | A | 10/1992 | Watts, Jr. et al. ............ 340/790 |
| 5,254,982 | A | 10/1993 | Feigenblatt et al. ......... 345/148 |
| 5,298,915 | A | 3/1994 | Bassetti, Jr. et al. ........ 345/149 |
| 5,334,996 | A | 8/1994 | Tanigaki et al. .............. 345/152 |
| 5,341,153 | A | 8/1994 | Benzschawel et al. ....... 345/152 |
| 5,349,451 | A | 9/1994 | Dethardt ..................... 358/518 |
| 5,467,102 | A | 11/1995 | Kuno et al. ..................... 345/1 |
| 5,543,819 | A | 8/1996 | Farwell et al. ............... 345/150 |
| 5,548,305 | A | 8/1996 | Rupel .......................... 345/150 |
| 5,555,360 | A | 9/1996 | Kumazaki et al. ........... 395/143 |
| 5,574,836 | A | * 11/1996 | Broemmelsiek ............ 345/127 |

(List continued on next page.)

OTHER PUBLICATIONS

Abram, G. et al. "Efficient Alias–free Rendering using Bit–masks and Look–up Tables" *San Francisco*, vol. 19, No. 3, 1985 (pp. 53–59).
Ahumada, A.J. et al. "43.1: A Simple Vision Model for Inhomogeneous Image–Quality Assessment" *1998 SID*.
Barbier, B. "25.1: Multi–Scale Filtering for Image Quality on LCD Matrix Displays" *SID 96 Digest*.
Barten, P.G.J. "P–8: Effect of Gamma on Subjective Image Quality" *SID 96 Digest*.

(List continued on next page.)

Primary Examiner—Jeffery Brier
(74) Attorney, Agent, or Firm—Workman, Nydegger

(57) ABSTRACT

The present invention relates to methods and apparatus for increasing the perceived quality of displayed images. This is achieved in a variety of ways including the use of a plurality of device specific display characteristics when preparing images for display. It is also achieved through the monitoring of display device and/or ambient light conditions, e.g., on a periodic basis, and using the obtained information when controlling display output. Another approach to improving the perceived quality of displayed images involves the use of information relating to a specific user's ability to perceive image characteristics such as color. By customizing display output to an individual user's own physical perception capabilities and/or viewing characteristics it is possible to enhance the image quality perceived by the individual viewer as compared to embodiments which do not take into consideration individual user characteristics.

52 Claims, 24 Drawing Sheets

U.S. PATENT DOCUMENTS

| | | | |
|---|---|---|---|
| 5,627,569 A | | 5/1997 | Matsuzaki et al. .......... 345/214 |
| 5,633,654 A | | 5/1997 | Kennedy, Jr. et al. ...... 345/114 |
| 5,689,283 A | | 11/1997 | Shirochi ..................... 345/132 |
| 5,748,200 A | * | 5/1998 | Funahashi ................... 345/507 |
| 5,764,214 A | * | 6/1998 | Takano ........................ 345/112 |
| 5,767,837 A | | 6/1998 | Hara ........................... 345/152 |
| 5,796,385 A | | 8/1998 | Rich ........................... 345/155 |
| 5,805,118 A | * | 9/1998 | Mishra et al. ................ 345/1.1 |
| 5,821,913 A | | 10/1998 | Mamiya ....................... 345/88 |
| 5,847,698 A | | 12/1998 | Reavey et al. .............. 345/173 |
| 5,894,300 A | | 4/1999 | Takizawa .................... 345/115 |
| 5,933,130 A | * | 8/1999 | Wagner ....................... 345/147 |
| 5,949,643 A | | 9/1999 | Batio .......................... 361/681 |
| 5,952,994 A | | 9/1999 | Ong et al. ................... 345/127 |
| 5,963,185 A | | 10/1999 | Havel ........................... 345/83 |
| 6,002,386 A | * | 12/1999 | Gu .............................. 345/147 |
| 6,075,513 A | * | 6/2000 | Reddy et al. ................ 345/112 |
| 6,192,341 B1 | * | 2/2001 | Becker et al. .............. 345/471 |
| 6,243,059 B1 | * | 6/2001 | Greene et al. ................ 345/88 |

OTHER PUBLICATIONS

Beck. D.R. "Motion Dithering for Increasing Perceived Image Quality for Low–Resolution Displays" *1998 SID*.

Bedford–Roberts, J. et al. "10.4: Testing the Value of Gray–Scaling for Images of Handwriting" *SID 95 Digest*, pp. 125–128.

Chen, L.M. et al. "Visual Resolution Limits for Color Matrix Displays" *Displays–Technology and Applications*, vol. 13, No. 4, 1992, pp. 179–186.

Cordonnier, V. "Antialiasing Characters by Pattern Recognition" *Proceedings of the S.I.D.* vol. 30, No. 1, 1989, pp. 23–28.

Cowan, W. "Chapter 27, Displays for Vision Research" *Handbook of Optics, Fundamentals, Techniques& Design*, Second Edition, vol. 1, pp. 27.1–27.44.

Crow, F.C. "The Use of Grey Scale for Improved Raster Display of Vectors and Characters" *Computer Graphics*, vol. 12, No. 3, Aug. 1978, pp. 1–5.

Feigenblatt, R.I., "Full–color Imaging on amplitude–quantized color mosaic displays" *Digital Image Processing Applications SPIE* vol. 1075 (1989) pp. 199–205.

Gille, J. et al. "Grayscale/Resolution Tradeoff for Text: Model Predictions" *Final Report*, Oct. 1992–Mar. 1995.

Gould, J.D. et al. "Reading From CRT Displays Can Be as Fast as Reading From Paper" *Human Factors*, vol. 29 No. 5, pp. 497–517, Oct. 1987.

Gupta, S. et al. "Anti–Aliasing Characters Displayed by Text Terminals" *IBM Technical Disclosure Bulletin*, May 1983 pp. 6434–6436.

Hara, Z. et al. "Picture Quality of Different Pixel Arrangements for Large–Sized Matrix Displays" *Electronics and Communications in Japan*, Part 2, vol. 77, No. 7, 1974, pp. 105–120.

Kajiya, J. et al. "Filtering High Quality Text For Display on Raster Scan Devices" *Computer Graphics*, vol. 15, No. 3, Aug. 1981, pp. 7–15.

Kato, Y. et al. "13:2 A Fourier Analysis of CRT Displays Considering the Mask Structure, Beam Spot Size, and Scan Pattern" (c) *1998 SID*.

Krantz, J. et al. "Color Matrix Display Image Quality: The Effects of Luminance and Spatial Sampling" *SID 90 Digest*, pp. 29–32.

Kubala, K. et al. "27:4: Investigation Into Variable Addressability Image Sensors and Display Systems" *1998 SID*.

Mitchell, D.P. "Generating Antialiased Images at Low Sampling Desities" *Computer Graphics*, vol. 21, No. 4, Jul. 1987, pp. 65–69.

Mitchell, D.P. et al., "Reconstruction Filters in Computer Graphics", *Computer Graphics*, vol. 22, No. 4, Aug. 1988, pp. 221–228.

Morris R.A., et al. "Legibility of Condensed Perceptually–tuned Grayscale Fonts" *Electronic Publishing, Artistic Imaging, and Digital Typography*, Seventh International Conference on Electronic Publishing, Mar. 30–Apr. 3, 1998, pp. 281–293.

Murch, G. et al. "7.1: Resolution and Addressability: How Much is Enough?" *SID 85 Digest*, pp. 101–103.

Naiman, A., "Some New Ingredients for the Cookbook Approach to Anti–Aliased Text" *Proceedings Graphics Interface 81*, Ottawa, Ontario, May 28–Jun. 1, 1984, pp. 99–108.

Naiman, A, et al. "Rectangular Convolution for Fast Filtering of Characters" *Computer Graphics*, vol. 21, No. 4, Jul. 1987, pp. 233–242.

Naiman, A.C. "10:1 The Visibility of Higher–Level Jags" *SID 95 Digest* pp. 113–116.

Peli, E. "35.4: Luminance and Spatial–Frequency Interaction in the Perception of Contrast", *SID 96 Digest*.

Pringle, A., "Aspects of Quality in the Design and Production of Text", *Association of Computer Machinery* 1979, pp. 63–70.

Rochellec, J. Le et al. "35.2: LCD Legibility Under Different Lighting Conditions as a Function of Character Size and Contrast" *SID 96 Digest*.

Schmandt, C. "Soft Typography" *Information Processing 80, Proceedings of the IFIP Congress* 1980, pp. 1027–1031.

Sheedy, J.E. et al. "Reading Performance and Visual Comfort with Scale to Grey Compared with Black–and–White Scanned Print" *Displays*, vol. 15, No. 1, 1994, pp. 27–30.

Sluyterman, A.A.S. "13:3 A Theoretical Analysis and Empirical Evaluation of the Effects of CRT Mask Structure on Character Readability" (c) *1998 SID*.

Tung. C., "Resolution Enhancement Technology in Hewlett–Packard LaserJet Printers" *Proceedings of the SPIE—The International Society for Optical Engineering*, vol. 1912, pp. 440–448.

Warnock, J.E. "The Display of Characters Using Gray Level Sample Arrays", *Association of Computer Machinery*, 1980, pp. 302–307.

Whitted, T. "Anti–Aliased Line Drawing Using Brush Extrusion" *Computer Graphics*, vol. 17, No. 3, Jul. 1983, pp. 151,156.

Yu, S., et al. "43:3 How Fill Factor Affects Display Image Quality" (c) *1998 SID*.

"Cutting Edge Display Technology—The Diamond Vision Difference" www.amasis.com/diamondvision/technical.html, Jan. 12, 1999.

"Exploring the Effect of Layout on Reading from Screen" http://fontweb/internal/repository/research/explore.asp?RES=ultra, 10 pages, Jun. 3, 1998.

"How Does Hinting Help?" http://www.microsoft.com/typography/hinting/how.htm/fname=%20&fsize, Jun. 30, 1997.

"Legibility on screen: A report on research into line length, document height and number of columns" http://fontweb/internal/repository/research/scrnlegi.asp?RES=ultra Jun. 3, 1998.

"The Effect of Line Length and Method of Movement on reading from screen" http://fontweb/internal/repository/research/linelength.asp?RES=ultra, 20 pages, Jun. 3, 1998.

"The Legibility of Screen Formats: Are Three Columns Better Than One?" http://fontweb/internal/repository/research/scrnformat.asp?RES=ultra, 16 pages, Jun. 3, 1998.

"The Raster Tragedy at Low Resolution" http://www.microsoft.com/typography/tools/trtalr.htm?fname=%20&fsize.

"The TrueType Rasterizer" http://www.microsoft.com/typography/what/raster.htm?fname=%20&fsize, Jun. 30, 1997.

"TrueType fundamentals" http://www.microsoft.com/OTSPEC/TTCHO1.htm?fname=%20&fsize= Nov. 16, 1997.

"True Type Hinting" http://www.microsoft.com/typography/hinting/hinting.htm Jun. 30, 1997.

"Typographic Research" http://fontweb/internal/repository/research/research2.asp?RES=ultra Jun. 3, 1998.

* cited by examiner

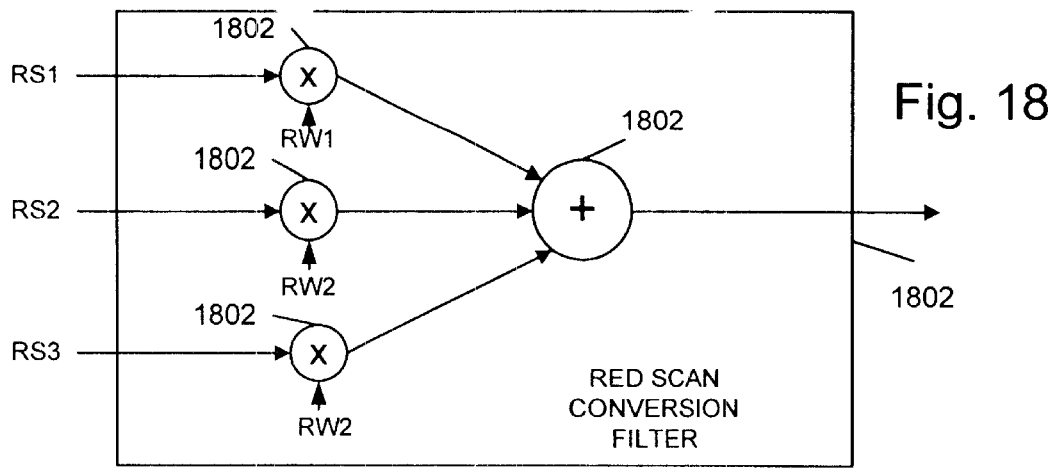
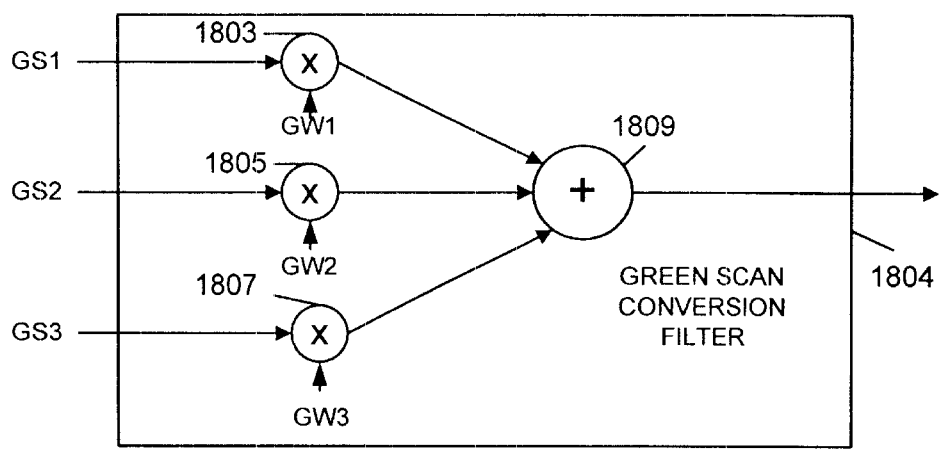
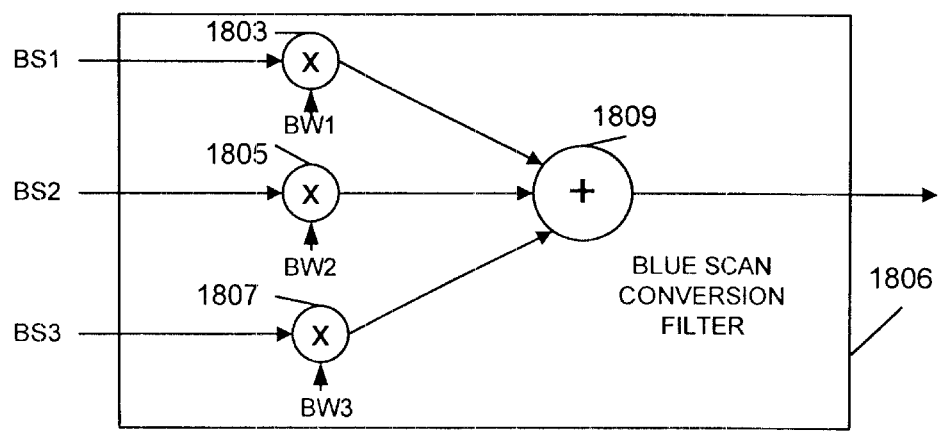
Fig. 18

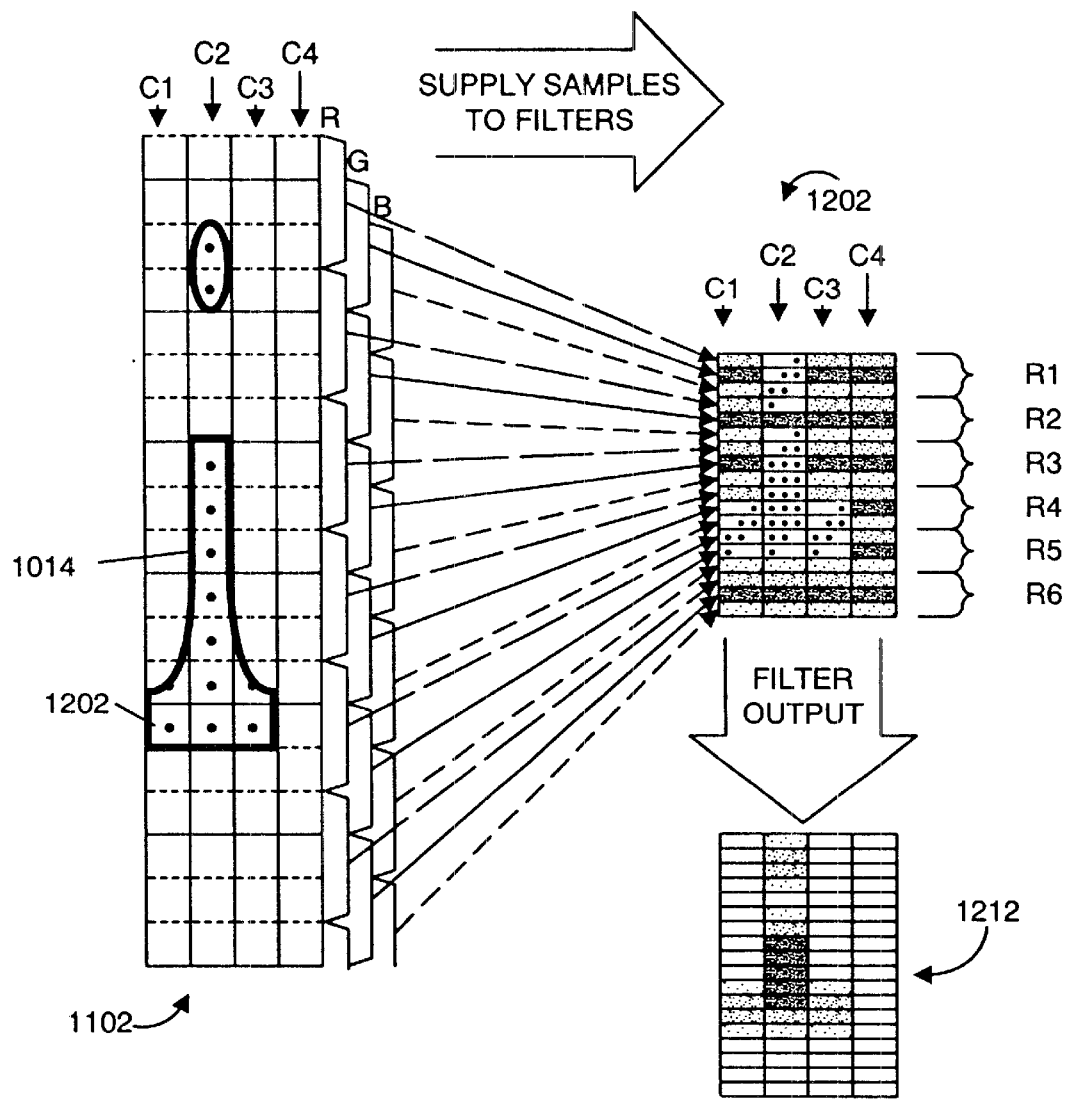
Fig. 19
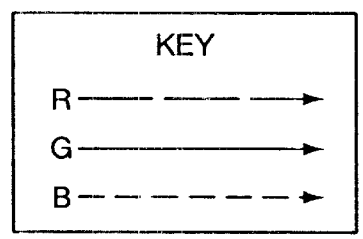

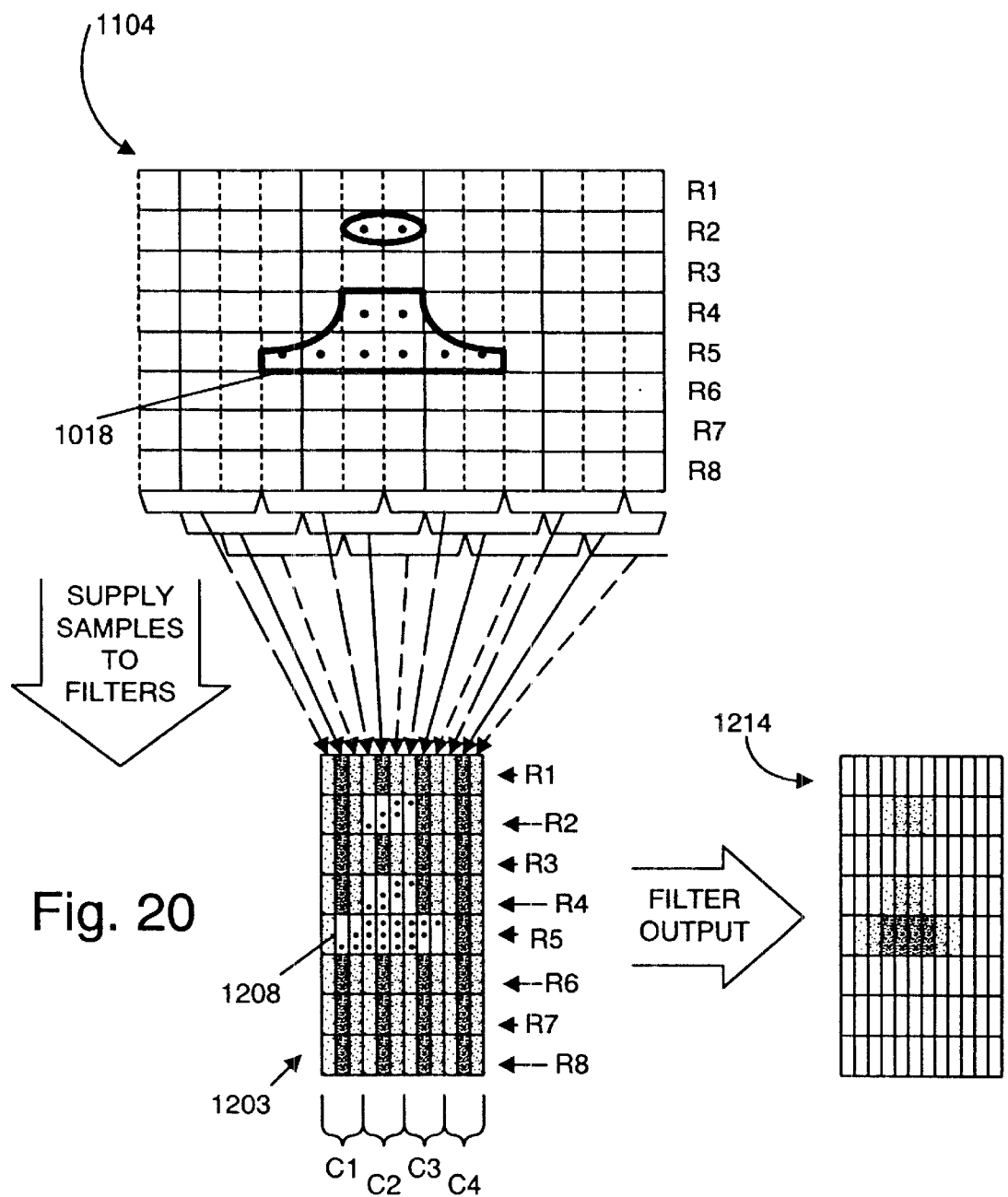
Fig. 20
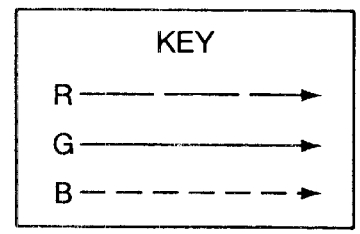

| FILTER 1 | | |
|---|---|---|
| RED FILTER | GREEN FILTER | BLUE FILTER |
| -0.000 | 0.000 | 0.000 |
| -0.000 | -0.000 | 0.000 |
| 0.001 | -0.000 | -0.000 |
| -0.004 | 0.000 | 0.000 |
| -0.001 | 0.000 | 0.000 |
| 0.011 | -0.002 | -0.001 |
| -0.037 | 0.006 | 0.005 |
| -0.015 | 0.001 | 0.002 |
| 0.109 | -0.020 | -0.014 |
| -0.255 | 0.065 | 0.031 |
| -0.231 | 0.028 | 0.029 |
| 0.632 | -0.186 | -0.075 |
| 0.576 | 0.383 | -0.097 |
| 0.485 | 0.430 | 0.357 |
| -0.378 | 0.458 | 0.630 |
| 0.051 | -0.111 | 0.351 |
| 0.085 | -0.108 | -0.103 |
| -0.039 | 0.075 | -0.177 |
| 0.003 | -0.009 | 0.040 |
| 0.009 | -0.017 | 0.041 |
| -0.003 | 0.007 | -0.027 |
| 0.000 | -0.001 | 0.003 |
| 0.001 | -0.002 | 0.006 |
| -0.000 | 0.001 | -0.003 |
| 0.000 | -0.000 | 0.000 |
| 0.000 | -0.000 | 0.001 |
| -0.000 | 0.000 | -0.000 |
| -0.000 | -0.000 | 0.000 |
| 0.000 | -0.000 | 0.000 |
| 0.000 | 0.000 | -0.000 |

2301 — CURRENT PIXEL

| | FILTER 2 | | |
|---|---|---|---|
| RED FILTER | GREEN FILTER | BLUE FILTER | |
| 0.000 | 0.000 | -0.000 | |
| 0.000 | 0.000 | 0.000 | |
| -0.000 | 0.000 | 0.000 | |
| 0.000 | -0.000 | -0.000 | |
| 0.000 | -0.000 | -0.000 | |
| -0.000 | 0.000 | 0.000 | |
| -0.006 | -0.001 | 0.000 | |
| 0.004 | -0.001 | -0.001 | |
| 0.034 | -0.000 | -0.003 | |
| -0.183 | 0.019 | 0.018 | |
| -0.147 | -0.004 | 0.010 | 2302 |
| 0.468 | -0.093 | -0.055 | |
| 0.514 | 0.387 | 0.047 | CURRENT PIXEL |
| 0.445 | 0.430 | 0.308 | |
| -0.170 | 0.408 | 0.514 | |
| 0.009 | -0.072 | 0.251 | |
| 0.031 | -0.089 | -0.009 | |
| 0.001 | 0.020 | -0.119 | |
| -0.001 | 0.000 | 0.017 | |
| -0.000 | -0.003 | 0.025 | |
| 0.000 | -0.001 | -0.004 | |
| -0.000 | 0.000 | -0.000 | |
| -0.000 | 0.000 | 0.001 | |
| 0.000 | -0.000 | 0.000 | |
| 0.000 | 0.000 | -0.000 | |
| -0.000 | 0.000 | -0.000 | |
| -0.000 | 0.000 | 0.000 | |
| 0.000 | -0.000 | -0.000 | |
| 0.000 | -0.000 | -0.000 | |
| -0.000 | 0.000 | -0.000 | |

FIG. 23B

| | FILTER 3 | |
|---|---|---|
| RED FILTER | GREEN FILTER | BLUE FILTER |
| 0.000 | -0.000 | -0.000 |
| 0.000 | -0.000 | -0.000 |
| 0.000 | 0.000 | -0.000 |
| -0.000 | 0.000 | 0.000 |
| -0.000 | -0.000 | 0.000 |
| -0.001 | -0.000 | -0.000 |
| 0.006 | 0.000 | -0.000 |
| 0.009 | 0.001 | -0.000 |
| 0.002 | 0.002 | 0.001 |
| -0.121 | -0.015 | -0.001 |
| -0.088 | -0.026 | -0.007 |
| 0.332 | -0.022 | -0.022 |
| 0.459 | 0.393 | 0.140 |
| 0.418 | 0.430 | 0.290 |
| -0.002 | 0.367 | 0.412 |
| -0.010 | -0.048 | 0.190 |
| -0.005 | -0.075 | 0.040 |
| 0.002 | -0.013 | -0.059 |
| -0.000 | 0.003 | 0.005 |
| -0.000 | 0.003 | 0.011 |
| -0.000 | 0.000 | 0.003 |
| 0.000 | -0.000 | -0.001 |
| 0.000 | -0.000 | -0.001 |
| 0.000 | 0.000 | -0.000 |
| -0.000 | 0.000 | 0.000 |
| -0.000 | 0.000 | 0.000 |
| -0.000 | -0.000 | -0.000 |
| 0.000 | 0.000 | -0.000 |
| 0.000 | 0.000 | -0.000 |
| -0.000 | 0.000 | 0.000 |

2303 — CURRENT PIXEL

FIG. 23C

|  | FILTER 4 |  |
|---|---|---|
| RED FILTER | GREEN FILTER | BLUE FILTER |
| 0.000 | 0.000 | 0.000 |
| 0.000 | 0.000 | 0.000 |
| -0.000 | -0.000 | -0.000 |
| -0.001 | -0.000 | -0.000 |
| -0.001 | -0.000 | -0.000 |
| 0.001 | 0.000 | 0.000 |
| 0.008 | 0.003 | 0.002 |
| 0.008 | 0.004 | 0.002 |
| -0.007 | -0.002 | -0.001 |
| -0.077 | -0.037 | -0.017 |
| -0.051 | -0.039 | -0.019 |
| 0.237 | 0.026 | 0.008 |
| 0.419 | 0.398 | 0.197 |
| 0.401 | 0.429 | 0.285 |
| 0.113 | 0.338 | 0.337 |
| -0.016 | -0.035 | 0.153 |
| -0.025 | -0.066 | 0.065 |
| -0.011 | -0.031 | -0.012 |
| 0.001 | 0.004 | -0.000 |
| 0.002 | 0.006 | 0.001 |
| 0.001 | 0.003 | 0.001 |
| -0.000 | -0.000 | -0.000 |
| -0.000 | -0.001 | -0.000 |
| -0.000 | -0.000 | -0.000 |
| 0.000 | 0.000 | 0.000 |
| 0.000 | 0.000 | 0.000 |
| 0.000 | 0.000 | 0.000 |
| -0.000 | -0.000 | -0.000 |
| -0.000 | -0.000 | -0.000 |
| -0.000 | -0.000 | -0.000 |

The rows containing 0.419/0.398/0.197, 0.401/0.429/0.285, and 0.113/0.338/0.337 are boxed and labeled 2304 CURRENT PIXEL.

FIG. 23D

FILTER 5

| RED FILTER | GREEN FILTER | BLUE FILTER | |
|---|---|---|---|
| 0.000 | 0.000 | 0.000 | |
| 0.000 | 0.000 | 0.000 | |
| -0.000 | -0.000 | -0.000 | |
| -0.001 | -0.001 | -0.000 | |
| -0.001 | -0.001 | -0.000 | |
| 0.001 | 0.001 | 0.000 | |
| 0.006 | 0.006 | 0.004 | |
| 0.006 | 0.006 | 0.003 | |
| -0.008 | -0.007 | -0.004 | |
| -0.050 | -0.050 | -0.029 | |
| -0.030 | -0.047 | -0.027 | 2305 |
| 0.178 | 0.054 | 0.029 | |
| 0.394 | 0.402 | 0.229 | CURRENT PIXEL |
| 0.391 | 0.429 | 0.283 | |
| 0.183 | 0.321 | 0.291 | |
| -0.018 | -0.028 | 0.132 | |
| -0.037 | -0.061 | 0.078 | |
| -0.023 | -0.040 | 0.019 | |
| 0.002 | 0.004 | -0.002 | |
| 0.005 | 0.008 | -0.004 | |
| 0.003 | 0.005 | -0.003 | |
| -0.000 | -0.000 | 0.000 | |
| -0.001 | -0.001 | 0.001 | |
| -0.000 | -0.001 | 0.000 | |
| 0.000 | 0.000 | -0.000 | |
| 0.000 | 0.000 | -0.000 | |
| 0.000 | 0.000 | -0.000 | |
| -0.000 | -0.000 | 0.000 | |
| -0.000 | -0.000 | 0.000 | |
| -0.000 | -0.000 | 0.000 | |

FIG. 23E

METHODS AND APPARATUS FOR IMPROVING THE QUALITY OF DISPLAYED IMAGES THROUGH THE USE OF DISPLAY DEVICE AND DISPLAY CONDITION INFORMATION

PRIORITY CLAIM

This application claims the benefit of the filing date of Provisional U.S. patent application Ser. No. 60/118,087 filed Feb. 1, 1999.

FIELD OF THE INVENTION

The present invention relates to methods and apparatus for displaying images, and more particularly, to methods and apparatus for increasing the perceived quality of displayed images.

BACKGROUND OF THE INVENTION

Color display devices have become the principal display devices of choice for most computer users. The display of color on a monitor is normally achieved by operating the display device to emit light, e.g., a combination of red, green, and blue light, which results in one or more colors being perceived by a human viewer.

In cathode ray tube (CRT) display devices, the different colors of light are generated via the use of phosphor coatings which may be applied as dots in a sequence on the screen of the CRT. A different phosphor coating is normally used to generate each of the three colors, red, green, and blue resulting in repeating sequences of phosphor dots which, when excited by a beam of electrons will generate the colors red, green and blue.

As CRT's age, the light output intensity tends to decrease for a given input intensity. Thus, older computer CRT display devices tend to be more difficult to read than new CRTs.

The term pixel is commonly used to refer to one spot in, e.g., a rectangular grid of thousands of such spots. The spots are individually used by a computer to form an image on the display device. For a color CRT, where a single triad of red, green and blue phosphor dots cannot be addressed, the smallest possible pixel size will depend on the focus, alignment and bandwidth of the electron guns used to excite the phosphors. The light emitted from one or more triads of red, green and blue phosphor dots, in various arrangements known for CRT displays, tend to blend together giving, at a distance, the appearance of a single colored light source.

In color displays, the intensity of the light emitted corresponding to the additive primary colors, red, green and blue, can be varied to get the appearance of almost any desired color pixel. Adding no color, i.e., emitting no light, produces a black pixel. Adding 100 percent of all three colors results in white.

Liquid crystal displays (LCDs), or other flat panel display devices are commonly used in portable computer devices in the place of CRTs. This is because flat panel displays tend to be small and lightweight in comparison to CRT displays. In addition, flat panel displays tend to consume less power than comparable sized CRT displays making them better suited for battery powered applications than CRT displays.

As the quality of flat panel color displays continues to increase and their cost decreases, flat panel displays are beginning to replace CRT displays in desktop applications. Accordingly, flat panel displays, and LCDs in particular, are becoming ever more common.

Color LCD displays are exemplary of display devices which utilize multiple distinctly addressable elements, referred to herein as pixel sub-elements or pixel sub-components, to represent each pixel of an image being displayed. In displays commonly used for computer applications, each pixel on a color LCD display usually comprises three non-square elements, i.e., red, green and blue (RGB) pixel sub-components. Thus, in such systems, a set of RGB pixel sub-components together make up a single pixel. LCD displays of this type comprise a series of RGB pixel sub-components which are commonly arranged to form stripes along the display. The RGB stripes normally run the entire length of the display in one direction. The resulting RGB stripes are sometimes referred to as "RGB striping". Common LCD monitors used for computer applications, which are wider than they are tall, tend to have RGB stripes running in the vertical direction. While RGB striping is common, R, G, B pixel sub-components of different rows may be staggered or off set so that they do not form stripes.

Other LCD pixel sub-component display patterns are also possible. For example, in some devices, each color pixel includes four square pixel sub-components.

While LCD devices offer some advantages over CRT display devices in terms of power consumption and weight, the perceived quality of LCD displays can be significantly impacted by viewing angle. The amount and color of light incident on an LCD device can also have a major impact on the perceived quality of images displayed on the LCD device. In addition, LCDs tend to have response characteristics which can vary widely from display to display and even among the same model displays made by the same manufacturer.

Perceived image quality of a display device depends not only on the physical characteristics of the display device, but also on the viewer's ability to perceive such characteristics. For example, a viewer with a greater sensitivity to one color will perceive an image differently than a viewer with a greater sensitivity to another color. Viewers without the ability to perceive color at all are likely to perceive the quality of a color image somewhat differently than a viewer who can appreciate the supplied color information.

In view of the above, it is clear that physical display device characteristics, viewing conditions, e.g., ambient light, and a user's ability to perceive various image characteristics all have an effect on the perceived quality of an image.

Given the quality of current display devices, it is apparent that for many applications improvements in image quality are not only desirable but also important to insure a user's accurate interpretation of displayed images.

In view of the above, it is apparent that there is a need for new and improved methods and apparatus for displaying images such as text and graphics. It is desirable that at least some of the new methods and apparatus be capable of being used with both CRT as well as LCD display devices. Furthermore, in order to enhance the quality of images for specific viewers it is desirable that at least some display methods take into consideration how specific users perceive the images being displayed to them.

SUMMARY OF THE PRESENT INVENTION

The present invention relates to methods and apparatus for increasing the perceived quality of displayed images. This is achieved in a variety of ways including the use of a plurality of device specific display characteristics and/or user preference or perception information when preparing images for display. The display device information (DDI) may be stored in what is referred to as a display device profile (DDP). User preference and/or perception information is stored in a user profile.

In accordance with one feature of the present invention display device output characteristics and/or ambient light conditions are monitored, e.g., on a periodic basis. The information obtained from the monitoring operation is used to update the DDP for the monitored display device. The information in the DDP is then used when generating an image for display.

Using information relating to a specific user's viewing preferences and/or ability to perceive image characteristics such as color also improves the perceived quality of displayed images. By customizing display output to an individual user's own physical perception capabilities and/or viewing characteristics it is possible to enhance the image quality perceived by the individual viewer as compared to embodiments which do not take into consideration individual user characteristics.

Display device information used in accordance with the present invention may be stored in a display device profile. This profile may be provided by the device manufacturer and loaded onto a computer system or other device at the time the system is configured for use with the display. Alternatively, the information may be stored in the display device and supplied to a system coupled thereto in response to a request for display device information. Yet another alternative is to maintain a database of display device information including information on a plurality of different display devices. The database may be maintained as part of the operating system. Device specific information is retrieved therefrom when a particular display device is used or installed.

The display device profile may include such information as the device's date of manufacture and the type of display. It may also include information on the display device's gamut, white point, gamma, pixel pattern, resolution, element shape and/or method of light modulation. The display device type may be CRT, reflective LCD, transmissive LCD, etc. The white point may be expressed in tristimulus values or R, G, B luminance values. Pixel pattern may be expressed in terms of the order or sequence of color pixel sub-components, e.g., RGB, BGR, RGGB, or any other implemented configuration. Display element shape information identifies, e.g., the shape of display pixels, e.g., square, rectangular, triangular or circular, and/or the shape of pixel sub-components which may also be square, rectangular, triangular or circular. The light modulation information indicates, e.g., whether color information is spatially or time modulated. In the case of spatial light modulation different color light is displayed at different positions on the screen. In the. case of time modulation, different colors of light are displayed on the same portion of the screen at different times.

As discussed above, display device, e.g., profile information, may be periodically updated. This may be done by taking actual measurements of display device characteristics including light output. It may also be done by mathematically compensating for the age of the device and anticipated degradation in the device over time. In accordance with one feature of the invention, a display device's gamut, gamma and whitepoint values are updated in the display device profile to reflect measured or estimated changes due to age or use. Display age information may be obtained by subtracting display device installation information maintained by the operating system from current date information also maintained by the operating system. Alternatively, it can be obtained using date of manufacture information included in the original display device profile.

Ambient light conditions are measured, in accordance with one feature of the present invention, using the same device used to periodically measure display device light output characteristics. The ambient light condition information may include, e.g., information on whether a room light is on or off and/or information on the color components of the ambient light present. Ambient light condition information is used in an exemplary embodiment when controlling the display's light output. For example, information that the ambient light includes relatively more blue than red or green light, e.g., due to the use of fluorescent lights, results in a controlled decrease in the relative intensity of blue light emitted by the display device.

With regard to user perception and/or preference information, this information may include information on a specific user's ability to perceive color. Human color sensitivity can be measured by presenting the specific user with a simple test, e.g., displaying colors and then querying the user about his or her ability to perceive the displayed colors. The user perception information may also include user provided information on the user's viewing angle and/or position relative to the display screen. Information about a user's ability to perceive color and/or other perception information is stored in a user profile. The user profile can be maintained as part of the system's operating system.

The above discussed methods of improving the perceived quality of displayed images can be used individually or in combination.

While the methods and apparatus of the present invention can be used to enhance the perceived image quality of most display devices, they are well suited for use with color flat panel display devices, e.g., LCD displays. In order to enhance the image quality of color LCD display devices, e.g., when rendering text, the luminous intensity of pixel sub-components can be independently controlled so that each pixel sub-component can be used to represent different portions of an image. While this technique of pixel sub-component control can provide a gain in effective resolution in one dimension, it can lead to color distortions which can be caused by the independent luminous intensity control of pixel sub-components. In such systems, color correction processing may be used to detect and reduce or eliminate what would be interpreted by most people as objectionable color distortions. Unfortunately, such color correction or compensation operations tend to reduce the benefit in terms of increased effective resolution that is provided by treating the different color pixel sub-components as independent luminance sources.

In accordance with one feature of the present invention, color correction processing is implemented as a function of at least some of the above discussed display device information, ambient light condition information and/or user perception information. For example, color correction processing may be performed as a function of a display device's specific gamma values, detected ambient light conditions which will affect a human's ability to perceive color and/or the user's specific perception characteristics. For example, in the case of a color blind user, color compensation may automatically be disabled. In such a case, in LCD displays, an optimum or near optimum enhancement of image resolution may be achieved by treating pixel sub-components as independent luminance sources as opposed to a single luminance source. With color compensation disabled normally objectionable color distortions may exist in the displayed images. However, in the case of a color blind individual such distortions are not noticeable or objectionable and the increased effective resolution achieved by ignoring such color distortions is desirable.

Additional features, embodiments and benefits of the methods and apparatus of the present invention are discussed in the detailed description which follows.

BRIEF DESCRIPTION OF THE DRAWINGS

FIG. 3 illustrates the relationship between various software and hardware elements of the present invention and the data flow there between.

FIG. 18 illustrates anti-aliasing filters which may be used to implement a scan conversion operation in accordance with the present invention.

FIG. 19 illustrates an exemplary scan conversion operation suitable for use when preparing images for display on horizontally striped display devices.

FIG. 20 is an exemplary scan conversion operation suitable for use when preparing images for display on vertically striped display devices.

FIG. 23, which comprises the combination of FIGS. 23A–23E, illustrates multiple sets of filter coefficients each of which can be used to perform an anti-aliasing filtering operation.

DETAILED DESCRIPTION

Figure 1:
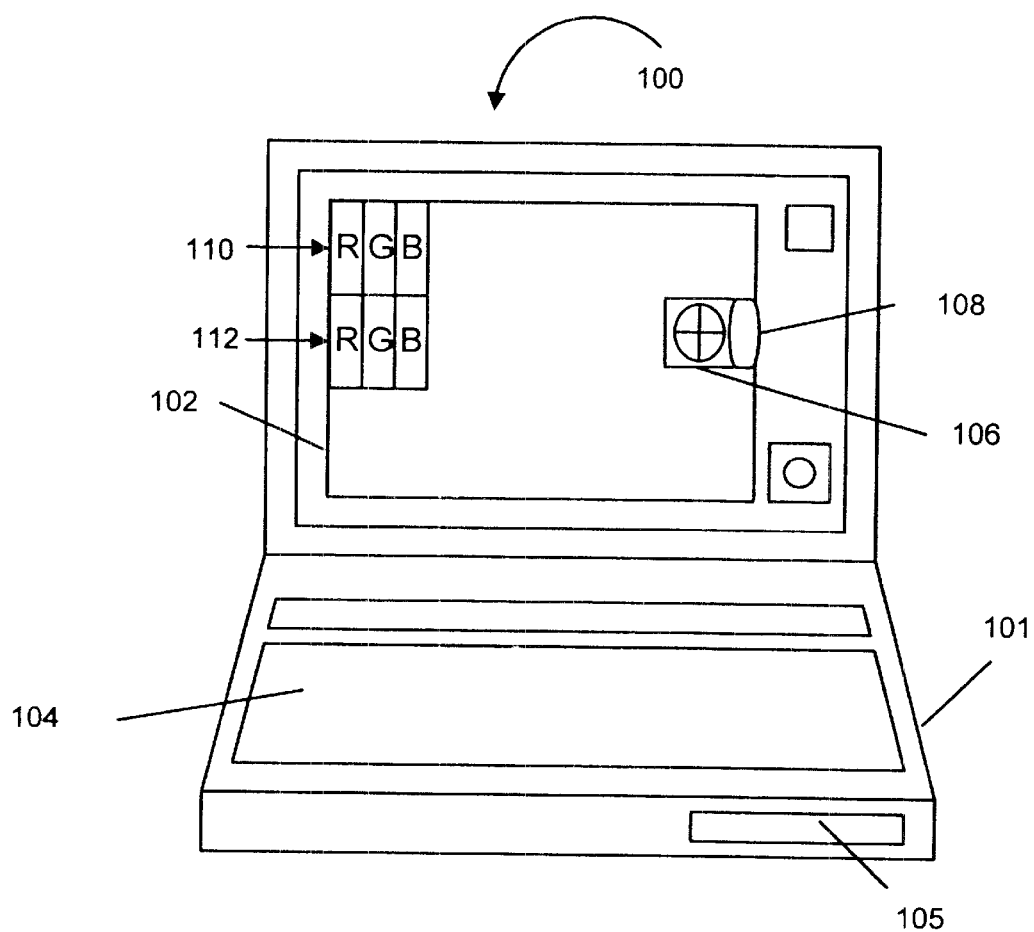
FIG. 1 illustrates a portable computer system implemented in accordance with one embodiment of the present invention.

FIG. 1 illustrates a portable computer system 100, which comprises a housing 101, a disk drive 105, keyboard 104 and a flat panel display 102. The display 102 is implemented as an LCD display device with vertical RGB striping. Each set of R, G, B pixel sub-components 110, 112 represent one pixel. While only two pixels 110, 112 are shown, it is to be understood that the display 102 comprises many rows and columns of such pixels. The computer system 100 includes a light measuring device 106 which is mounted using a hinge 108. The sensor 106 can be positioned in front of the display 102, as shown in FIG. 1, to measure the actual light output of the display 102. Such measurements may be taken periodically, in accordance with the present invention, when data on the state of the display device 102 is to be measured and used for updating a display profile. During the measurement, a pre-selected test pattern may be displayed on the screen 102.

When not being used to measure screen characteristics, the sensor 106 can be pivoted on the hinge 108 so that it is positioned in a direction facing away from, and not blocking, the display screen 102. In such a position, the sensor 106 can be used to measure ambient light conditions.

Figure 2:
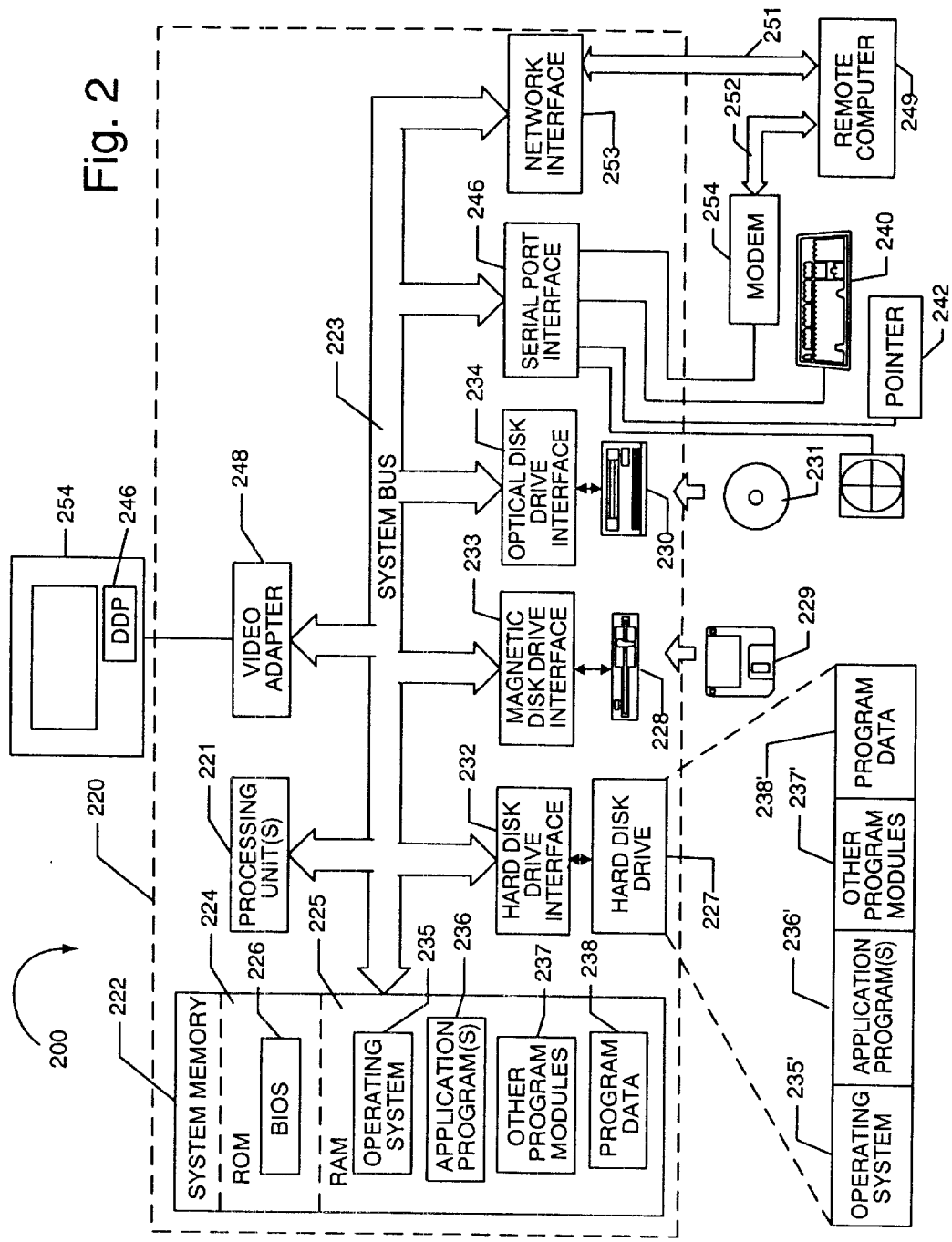
FIG. 2 illustrates a computer system, implemented in accordance with the present invention, in greater detail than FIG. 1.

FIG. 2 and the following discussion provide a brief, general description of an exemplary apparatus in which at least some aspects of the present invention may be implemented. Various methods of the present invention will be described in the general context of computer-executable instructions, e.g., program modules, being executed by a computer device such as a personal computer. Other aspects of the invention will be described in terms of physical hardware such as, e.g., display device components and display screens.

The methods of the present invention may be affected by other apparatus than the specific described computer devices. Program modules may include routines, programs, objects, components, data structures, etc. that perform task (s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules, routines and data, e.g., device profiles and user profile information, may be located in local and/or remote memory storage devices.

With reference to FIG. 2, an exemplary apparatus 200 for implementing at least some aspects of the present invention includes a general purpose computing device, e.g., a personal computer 220. The personal computer 220 may include a processing unit 221, a system memory 222, and a system bus 223 that couples various system components including the system memory to the processing unit 221. The system bus 223 may be any of several types of bus structures including a memory bus or memory controller, a peripheral bus, and a local bus using any of a variety of bus architectures. The system memory 222 may include read only memory (ROM) 224 and/or random access memory (RAM) 225. A basic input/output system 226 (BIOS), including basic routines that help to transfer information between elements within the personal computer 220, such as during start-up, may be stored in ROM 224. The personal computer 500 may also include a hard disk drive 227 for reading from and writing to a hard disk, (not shown), a magnetic disk drive 228 for reading from or writing to a (e.g., removable) magnetic disk 229, and an optical disk drive 230 for reading from or writing to a removable (magneto) optical disk 231 such as a compact disk or other (magneto) optical media. The hard disk drive 227, magnetic disk drive 228, and (magneto) optical disk drive 230 may be coupled with the system bus 223 by a hard disk drive interface 232, a magnetic disk drive interface 233, and a (magneto) optical drive interface 234, respectively. The drives and their associated storage media provide nonvolatile storage of machine readable instructions, data structures, program modules and other data for the personal computer 220. Although the exemplary environment described herein employs a hard disk, a removable magnetic disk 229 and a removable optical disk 231, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above. The removable magnetic disk 229 can be used for storing a display device profile (DDP) provided by the manufacturer of display device 247. The DDP can be transferred from the disk 229 to the system memory 222 for use by the operating system 235.

A number of program modules may be stored on the hard disk 223, magnetic disk 229, (magneto) optical disk 231, ROM 224 or RAM 225, such as an operating system 235, one or more application programs 236, other program modules 237, and/or program data 238 for example. A user may enter commands and information into the personal computer 220 through input devices, such as a keyboard 240 and pointing device 242 for example. Thus, a user can provide information via the available input devices regarding how the user perceives certain images, e.g., test images, and where the user is physically positioned relative to the display device 247 in terms of viewing angle. In addition, the user may use the input devices to select a position for various control settings, e.g., sliders, intended to provide user display preference information, e.g. gamma values preferences and/or preference for color accuracy vs. resolution.

Sensor 108 and other input devices (not shown) such as a microphone, joystick, game pad, satellite dish, scanner, or the like may also be included. These and other input devices are often connected to the processing unit 221 through a serial port interface 246 coupled to the system bus. However, input devices may be connected by other interfaces, such as a parallel port, a game port or a universal serial bus (USB). Liquid crystal display device 254 or another type of display device, e.g., a CRT display, may also be connected to the system bus 223 via an interface, such as a video adapter 248 for example. In the FIG. 2 embodiment, the display 254 includes display device profile information stored within the display 254. This information can be communicated to and stored in the system memory 222, e.g., via video adapter 248 and system bus 223.

In addition to the display 254, the personal computer 220 may include other peripheral output devices (not shown), such as speakers and printers for example.

The personal computer 220 may operate in a networked environment which defines logical connections to one or more remote computers, such as a remote computer 249. The remote computer 249 may be another personal computer, a server, a router, a network PC, a peer device or other common network node, and may include many or all of the elements described above relative to the personal computer 220, although only a memory storage device 250 has been illustrated in FIG. 2. The logical connections depicted in FIG. 2 include a local area network (LAN) 251 and a wide area network (WAN) 252, an intranet and the Internet.

When used in a LAN, the personal computer 220 may be connected to the LAN 251 through a network interface adapter (or "NIC") 253. When used in a WAN, such as the Internet, the personal computer 220 may include a modem 254 or other means for establishing communications over the wide area network 252. Thus, the personal computer 220 may receive display device profile information from, e.g., a display manufacturer over the Internet or by modem. The modem 254, which may be internal or external, may be connected to the system bus 223 via the serial port interface 246. In a networked environment, at least some of the program modules depicted relative to the personal computer 220 may be stored in the remote memory storage device. The network connections shown are exemplary and other means of establishing a communications link between the computers may be used.

Figure 3:
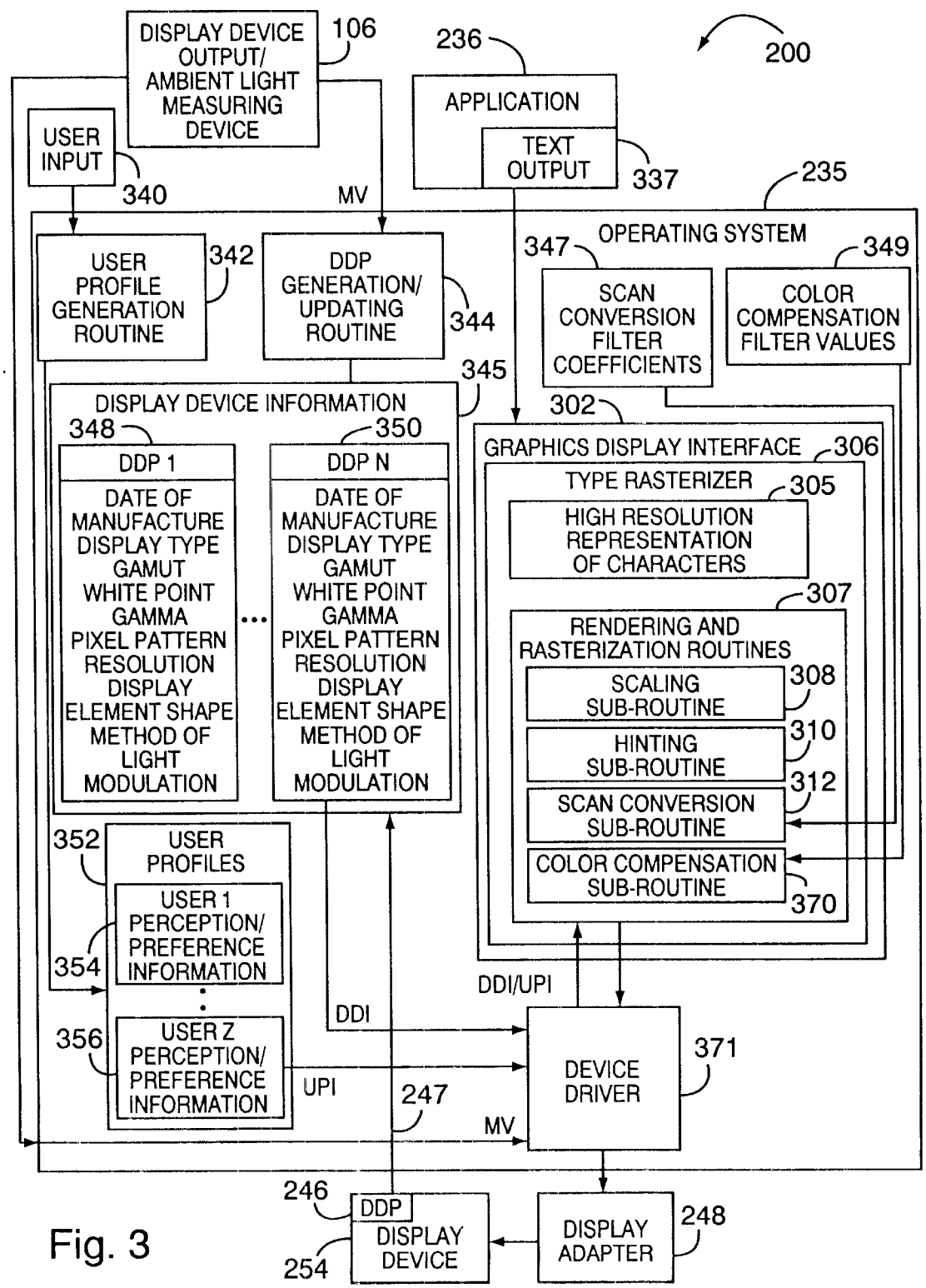

FIG. 3 illustrates the relationship between various hardware and software components of the system 200 and the components of the system's operating system 235.

As illustrated, the operating system 235 of the system 200 includes a plurality of routines, e.g., a user profile generation routine 342 and a DDP updating routine 344. The operating system 235 also includes additional components such as a graphics display interface 302, a device driver 371 and various data, e.g., display device information 345, user profiles 352, scan conversion filter coefficients 347 and color compensation filter values 349. As will be discussed further below, the graphics display interface 302 and device driver 371 may each include one or more routines.

The graphics display interface 302 in combination with the device driver 371 is responsible for preparing text and/or graphics information for output to the display adapter 248 so that it can be displayed on the display device 254. The graphics display interface includes a type rasterizer 306 which is responsible for generating bitmap representations of images to be displayed from input information, e.g., text output information 337 received from application 236. The information received from application 236 may include, e.g., information identifying the text characters to be displayed, and the font and point size to be used when displaying the text characters.

The type rasterizer 306 includes a set of high resolution digital representations of characters 305, and a set of rendering and rasterization routines 307. The digital representation of characters 305 may include font files which include scalable outline representations of characters and character spacing information. The character outlines may be expressed in the form of lines, points and/or curves. Portions of a character within a character outline represent foreground image areas while portions outside the character outlines, e.g., the area between characters, represent background image areas.

The set of rendering and rasterization routines 307 includes scaling, hinting and scan conversion subroutines 308, 310, 312 as well as a color compensation sub-routine 370. The scaling, hinting and scan conversion sub-routines 308, 310, 312 and color compensation sub-routine 370 user display device and/or user profile information, as will be discussed in detail below, in accordance with the present invention. In this manner, quality of generated images can be maximized for a particular display device and/or user of the system 200.

Scaling sub-routine 308 is responsible for scaling the outline representations of the characters to be rendered. This is done, in accordance with the present invention, as a function of pixel pattern and/or other display device information included in the display device profile corresponding to display 254 upon which the images are to be displayed.

Hinting sub-routine 310 is responsible for adjusting the shape and/or position of character outlines. Hinting is performed as a function of display device information, e.g., taking into consideration the position, shape, type and/or arrangement of pixel sub-components which comprise the display 254. Hinting may also take into consideration a user's ability to perceive color as expressed in terms of a user's sensitivity to color errors. In accordance with one embodiment of the present invention, hinting is performed to reduce color errors for users who have indicated a desire for color accuracy over resolution. For users who are not sensitive to color errors, e.g. color blind individuals. color accuracy is not an issue and the hinting is performed to maximize character shape and resolution without regard to the effect on an image's color.

Scan conversion sub-routine 312 is responsible for generating a bitmap representation of an image from the hinted outline representation produced by the hinting sub-routine 312. The scan conversion operation involves sampling the hinted outline image representation, filtering the sampled image values, and generating therefrom red, green and blue pixel sub-component scan conversion output values. As will be discussed below, the scan conversion output values may be used as luminous intensity levels or as blend coefficients sometimes called alpha values. In accordance with the present invention, the portions of the image which are sampled, to generate the scan conversion output values for each of the red, green and blue pixel sub-components, are displaced. That is, different but potentially overlapping image portions are used to generate each pixel sub-component scan conversion output value.

Figure 4:
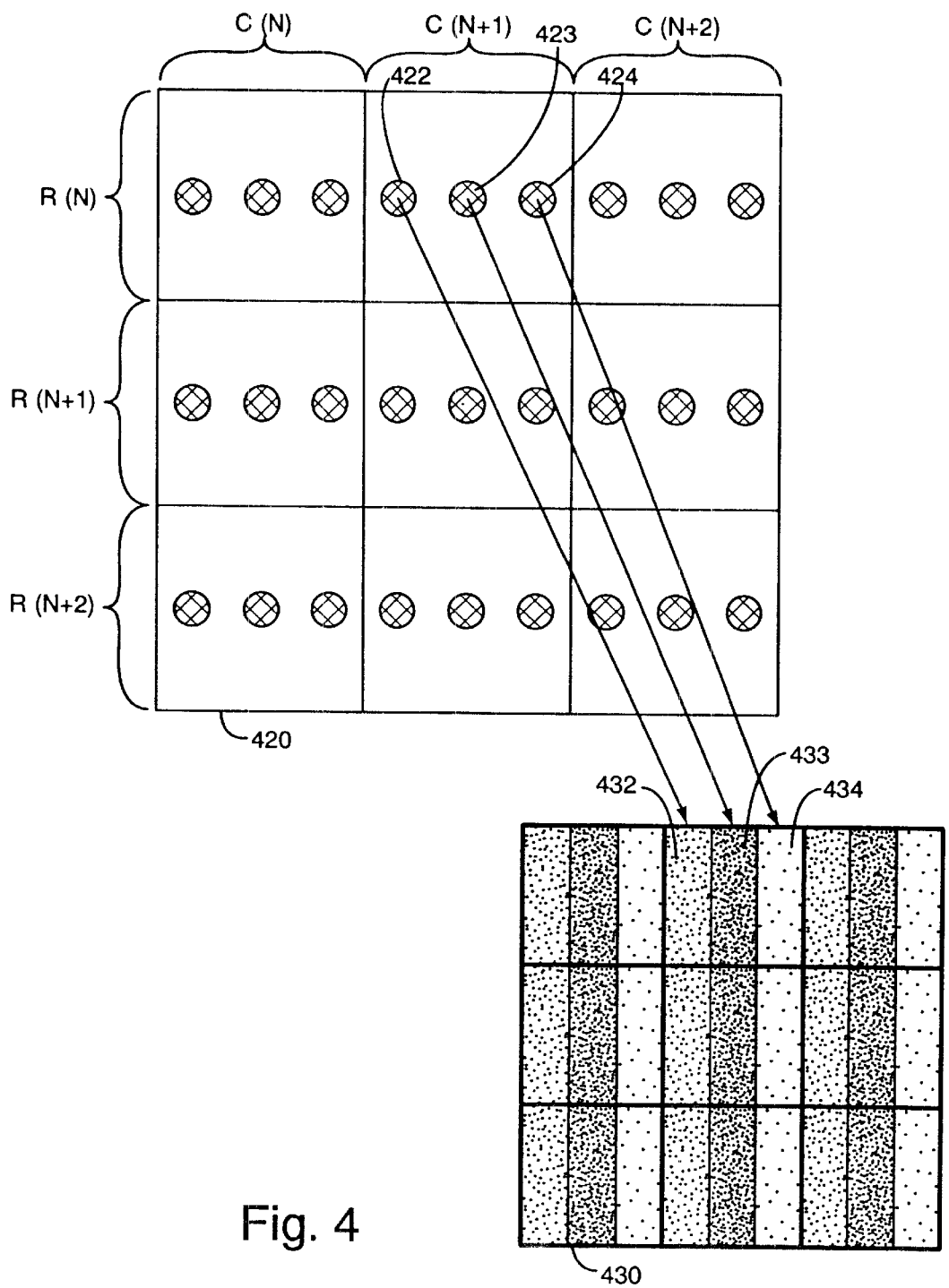
FIG. 4 illustrates displaced sampling performed in accordance with one embodiment of the present invention.

FIG. 4 illustrates a displaced sampling operation which may be performed as part of a scan conversion operation. In FIG. 4, block 420 represents an image which is to be sampled for scan conversion purposes. The nine square portions of the image 420 correspond in size to the size of a displayed pixel. Accordingly, the image 420 may be thought of as corresponding to three rows R(N), R(N+1) and R(N+2) and three columns C(N), C(N+1), C(N+2) of pixels. The block 430 represents pixels of the display device 254. Each square pixel includes a red 432, green 433 and blue 434 pixel sub-component. The arrow leading from sample 422 to pixel sub-component 432 indicates that the sample 422 was used to produce the luminous intensity value used to control pixel sub-component 432. The arrow leading from sample 423 to pixel sub-component 433 indicates that sample 423 was used to produce the luminous intensity value used to control pixel sub-component 433. Similarly, the arrow leading from sample 424 to pixel sub-component 434 indicates that sample 424 was used to produce the luminous intensity value used to control pixel sub-component 434. In the FIG. 4 example, a single displaced sample is used to generate each pixel sub-component luminous intensity value. Such an embodiment, could be implemented using a scan conversion filter with a width one sample wide in cases where filtering is performed as part of the scan conversion operation.

In accordance with the present invention, the scan conversion sub-routine 312 selects, as a function display device and/or user profile information, which one of a plurality of possible filters should be used during the scan conversion process. The various possible filters are implemented using filter coefficients sometimes referred to as tap or filter weights. The filter coefficients which may be used by the scan conversion subroutine are obtained, as needed, from the set of scan conversion filter coefficients 347.

The color compensation sub-routine 370 is responsible for processing image data, e.g., luminous intensity values, generated by the set of routines 368 to reduce and/or eliminate potentially distracting color errors. The processing performed by the color compensation sub-routine 370, can have the effect of improving color accuracy and reducing color errors, but it normally achieves this result at the expense of some degradation in image resolution. In accordance with one exemplary embodiment of the present invention, the trade off between resolution and color accuracy is made a function of the individual user's preference. This is done, in accordance with the present invention by having the color compensation sub-routine 370 select and use one or more filter values, from the set of color compensation filter values 349, as a function of user preference information.

The device driver 371 receives luminous intensity values and other information from the graphics display interface 302. It processes the supplied image information as a function of display device profile information and user profile information which it receives from the stored display device information 345 and the stored user profiles 352 to generate luminous intensity values which are output to the device driver 371 along with other display information, e.g., character spacing and/or positioning information. In addition to outputting the information to the display adapter 248, the device driver 371 supplies received display device information, e.g., display device profile information, and user profile information, to the type rasterizer 306 for use by the routines included therein.

The content, generation, updating and storage of display device profiles (DDPs) included in the set of display information 345 and user profiles 354, 356 included in the set of user profiles 352 will now be discussed.

As illustrated in FIG. 3, the set of display device information 345 includes a plurality of N DDPs 348, 350, where N represents the number of different supported display devices which may be used to display images at any given time by the system 200. In the set 345 of display device information each DDP corresponds to a different one of said N display devices. A user may access a DDP 348 through the operating system to verify and/or modify its contents.

Each DDP 348, 350 includes information identify the display device with which it is associated. It also includes the corresponding display device's date of manufacture and the type of display. It may also include information on the display device's gamut, white point, gamma, pixel pattern, resolution, dot pitch, light emitters' element shape and/or method of light modulation. Dot pitch information may be included as part of the resolution information. The display device type may be CRT, reflective LCD, transmissive LCD, etc. The white point may be expressed in tristimulus values or R, G, B luminance values. Pixel pattern may be expressed in terms of the order or sequence of color pixel sub-components, e.g., RGB, BGR, RGGB, or any other implemented configuration. Display element shape information identifies, e.g., the shape of display pixels, e.g., square, rectangular, triangular or circular, and/or the shape of pixel sub-components which may also be square, rectangular, triangular or circular. The light modulation information indicates, e.g., whether color information is spatially or time modulated. In the case of spatial light modulation different color light is displayed at different positions on the screen. In the case of time modulation, different colors of light are displayed on the same portion of the screen at different times.

The set of user profiles 352 includes a set of Z user profiles 354, 356, where Z represents the number of users for which distinct profiles have been created. The user profile associated with the user who is logged onto the computer system 200 at any particular time is the user profile which is used to control the generation and display of images at said particular time. The user perception information includes information on the user's ability to perceive color. This may be expressed as a sensitivity to color errors or as a preference for resolution over color accuracy. The user profile can also include user provided information on the user's viewing angle and/or position relative to the display screen. The position information may include, e.g., viewing angle and/or distance from the screen information. In addition, a user's preference for use of a particular gamma value when displaying and/or a user's expressed preference for trading off image resolution for color accuracy images may be stored in the user profile. Different preferred gamma values may be stored in a user profile by a user for use with different display devices.

In the most common case, a user is a person and therefor a user profile normally includes information about a human user's display preferences. However, a user profile can be used to store information about preferred display settings for a particular application or group of users and not merely for a single individual user. Accordingly, for purposes of collecting user preference information, storing user preference information and/or generating user profiles from user preference information, a user is to be interpreted broadly to include a group of people or class of people or, even a non-human entity such as a video or picture device or application. Exemplary devices which may be considered users include video cameras used to capture display output. In the case where a user is not an individual, user preferences are to be interpreted as information or settings which will produce the best display result for the group, device, or application using the display device.

Figure 5:
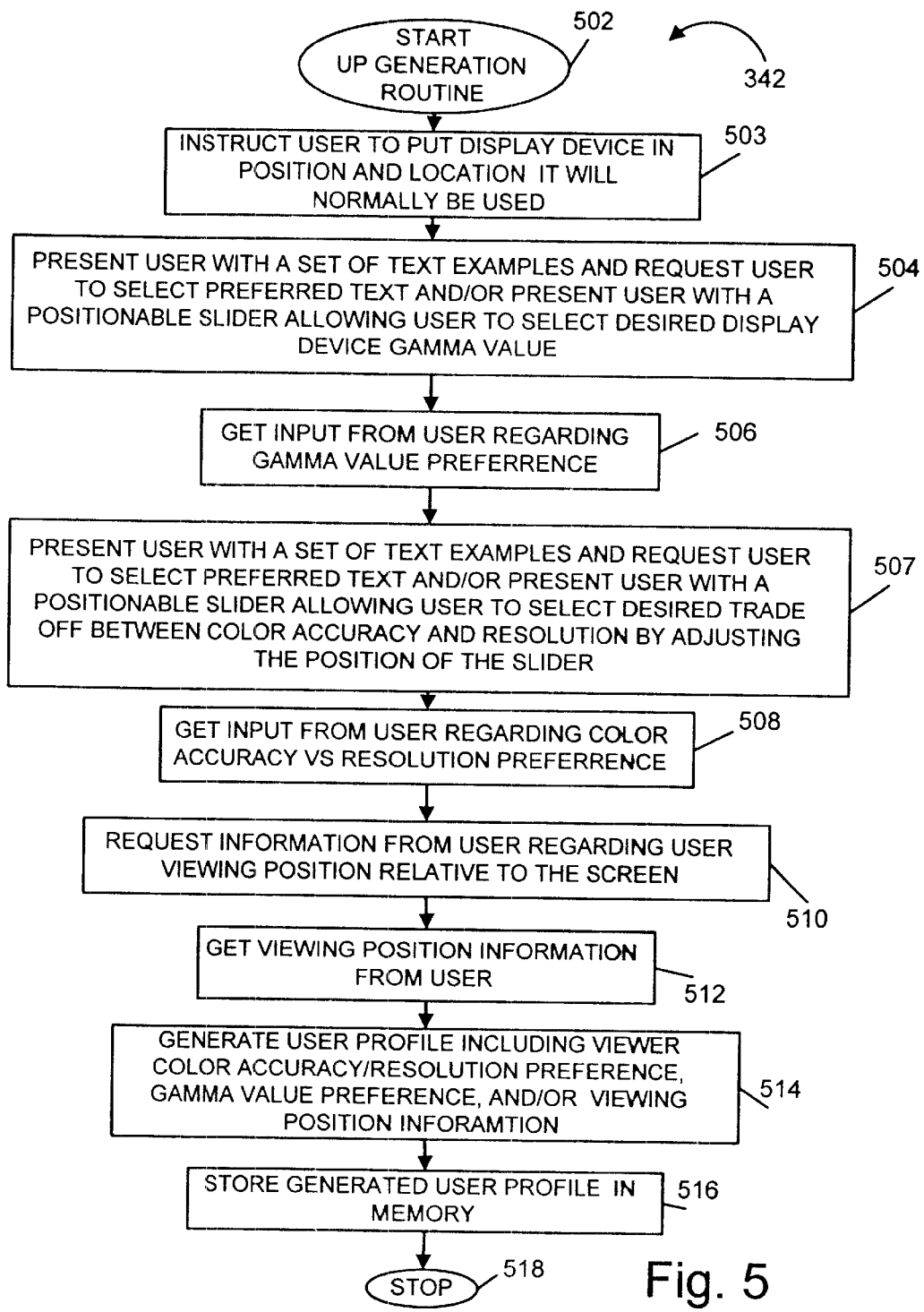
FIG. 5 illustrates a user profile generation routine implemented in accordance with one embodiment of the present invention.

The user profile generation routine 342 is responsible for generating user profiles in response to user input obtained from the input device 340. FIG. 5 illustrates the steps included in an exemplary user profile generation routine 342. The routine starts in step 502, e.g., when the routine is executed in response to a user attempting to initially configure the computer system 200, to update an existing user profile or to generate a new user profile. Operation proceeds from step 502 to step 503.

In step 503, the user is instructed to put the display device 254 in the position and location where it will normally be used. After giving the user time to adjust the position of the display device operation proceeds to step 504.

In step 504 the user is presented with a set of text examples, e.g., examples of text generated using different display device gamma values. A pre-selected, e.g., default or middle, position of the color accuracy vs. resolution adjustment control is used when generating the text examples in step 504. In response to the text examples, the user can select a desired gamma value by, e.g., clicking on the user preferred text.

Figure 8:
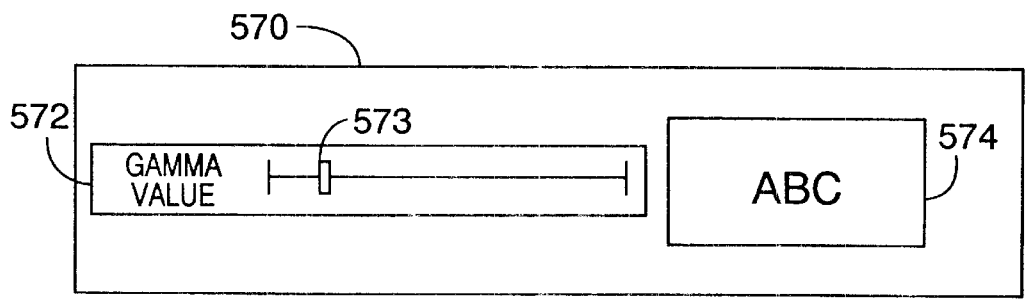
FIG. 8 illustrates a third exemplary screen display used in generating a user profile.

Alternatively, in step 504 the user is presented with a positionable slider 572 included in a display window 570, as in the FIG. 8 embodiment. The user can select a desired gamma value by adjusting the position of slider 572, e.g., by moving the slider position control bar 573.

From step 504 operation proceeds to step 506. In step 506 input, e.g., the slider setting or selection of preferred text, from the user regarding the user's gamma value preference is collected. The effect of any new slider position setting is reflected in the exemplary text 574 which is updated to reflect the user's gamma value selection.

While the collected gamma preference information may be added to a user profile, alternatively, it can be added and thus stored in the display device profile. In such a case, the gamma value selected by the user is stored as the display device's gamma value in the display device profile associated with the display being used. The gamma value stored in the display device profile is then used when displaying images regardless of the identity of the user. In such an embodiment, the use of the gamma slider and user input provides a method of updating gamma value information for a particular display device being used. It also provides a method of obtaining a gamma value for a display device where one has not been provided by the display device manufacturer.

Figure 6:
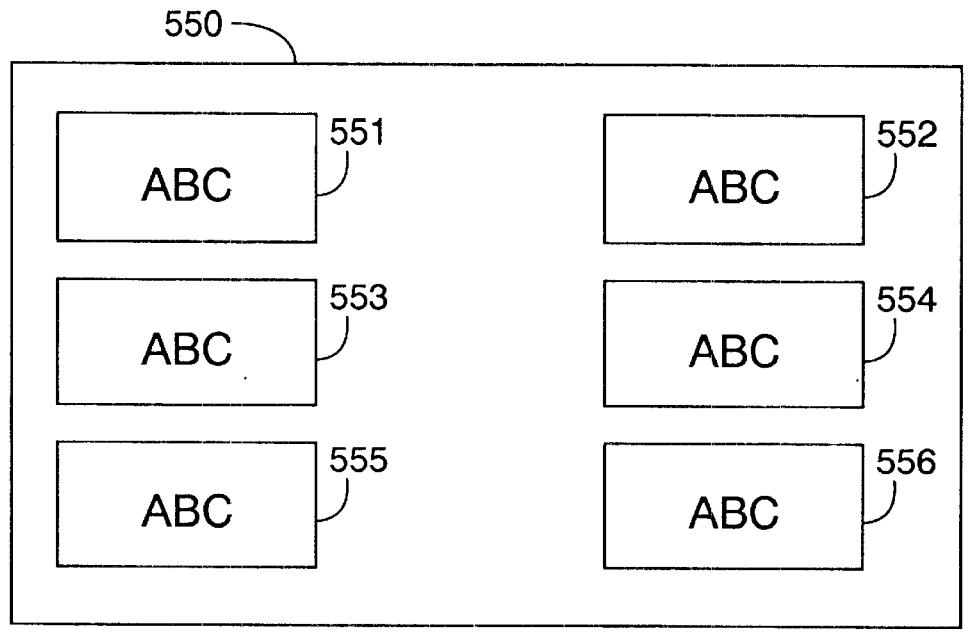
FIG. 6 illustrates a first exemplary screen display used in generating a user profile.

Next, in step 507, the user for whom the profile is being created is presented with a screen 550, as illustrated in FIG. 6, of text examples 551, 552, 553, 554, 555, 556, e.g., with differing degrees of color errors in them. The text examples are generated using the gamma setting information obtained in step 506.

Figure 7:
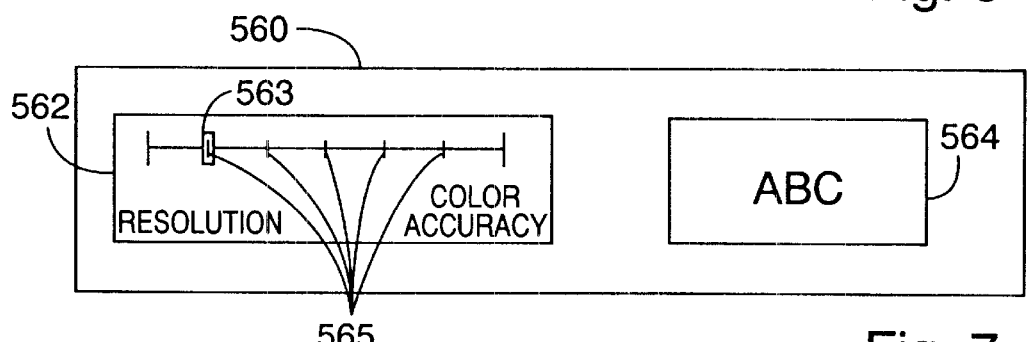
FIG. 7 illustrates a second exemplary screen display used in generating a user profile.

The user may select the preferred text representation by, e.g., double clicking on the preferred text example. In this manner, a user can indicate his or her ability to perceive color. Alternatively the user is presented, as illustrated in FIG. 7, in step 507, with a screen 560 which includes a user controllable slider 562 and exemplary text 564. The user can indicate the desired trade off between color accuracy and resolution by moving the control bar 563 of slider 562 to one of a plurality of settings, e.g., indicated by the small vertical lines, e.g., tick marks 565. The effect of any new slider position setting is reflected in the exemplary text 564.

In step 508, input from the user is obtained regarding the desired trade off regarding color accuracy vs. resolution. This information will normally reflect a user's ability to perceive color and/or the user's sensitivity to color errors. The input may be in the form of double clicking on displayed text which looks the best to the user, as in the FIG. 6 embodiment, or by adjusting the slider position as in the FIG. 7 embodiment.

Operation proceeds from step 508 to step 510. In step 510 the user is presented with a request for information regarding the user's viewing position relative to the screen. Viewing information from the user is collected in step 512. Then, in step 514, a user profile, e.g., preference information data file, including the particular viewer's color accuracy vs. resolution preference, gamma value preference and/or viewing position information is created. The generated user profile 354 or 356 is stored in memory, e.g., in block 352, for future use when the user logs into the computer system in which the created user profile is stored. With the storage of the generated user profile 354 or 356, operation of the user profile generation routine 342 stops in step 518 pending its re-execution, e.g., to generate a new user profile for a different user or take into consideration the use of a new or different display device.

In accordance with one exemplary embodiment, the slider 562 which allows a user to select a desired trade off between resolution and color accuracy controls the selection of multiple filter coefficients. The set of filter coefficients is used to control color correction filters when such filters are employed. Alternatively, e.g., in embodiments which use alpha blending, the filter coefficients are used to control filters, e.g., red, green and blue filters used during scan conversion, e.g., to perform an anti-aliasing filtering operation. In accordance with one particular exemplary embodiment, different sets of filter coefficients are stored in memory, e.g., one set of filter coefficients for each user selectable position of the slider 562. By supporting a large number, e.g., more than 20, sets of user selectable positions of the slider 562, the user can be presented with what appears to be a contiguous range of settings. While a large number sets of filter coefficients, e.g., more than 20, may be required for such an embodiment, given that it takes a relatively small amount of memory to store filter coefficient values, such an embodiment is practical given the amount of memory commonly available in modern personal computers.

FIG. 23 illustrates five sets of filter coefficients which may be used as scan conversion filter coefficients in an embodiment which uses alpha blending. For lower filter number settings of the slider 562, sharpness is preferred over color fidelity. For higher number filter settings of the slider 562, color fidelity is preferred over sharpness. Accordingly, use of the filter coefficients in filter set 1 of FIG. 23 will produce a higher resolution but image than will use of the filter coefficients in filter set 5. However, the image resulting from the use of the filter coefficients in filter set 1 will include more color errors than the image resulting from the use of the filter coefficients in filter set 5.

Each set of filter coefficients included in the table of FIG. 23 includes coefficients for a red, a green and a blue anti-aliasing filter having the general structure of the red, green and blue filters 1802, 1804, 1806 illustrated in FIG. 18 and discussed in detail below. 30 filter coefficients are stored in the table illustrated in FIG. 23 for each of the red, green and blue filters associated with a particular filter selection. Thus, while the filters 1802, 1804, 1806 illustrated in FIG. 18 each have 3 taps implemented using 3 multipliers, the filters used with the coefficients of FIG. 23 would each include 30 taps implemented using 30 multipliers, one for each of the 30 filter coefficients associated with the red, green and blue filters of FIG. 23. The input values, e.g., 30 intermediate alpha values, to each of the filters generated using the FIG. 23 filter coefficients are presumed to be alpha values which have been derived by sampling a source image at a rate of 6 times per pixel segment and then summing each pair of samples to produce 3 intermediate alpha values per pixel which serve as the input samples to the anti-aliasing filters. The box in each of FIGS. 23A–E, identified using numbers 2301, 2302, 2303, 2304, 2305, respectively, indicates the filter coefficients and thus filter taps corresponding to the 3 intermediate alpha values which correspond to the pixel for which the 3 filtered alpha values are being generated. Because separate red, green and blue filters are used, one filtered alpha value is produced per color channel resulting in 3 filtered alpha values per pixel.

The exemplary scan conversion filter coefficients in FIG. 23 are intended for use with a white background color and a black foreground color. The sets of coefficients are stored in memory 23 and accessed for purposes of scan conversion filtering in response to information about the user setting of the resolution vs color accuracy slider 562 maintained in the user profile. Thus, in accordance with the present invention, the user's setting of the resolution vs. color accuracy slider 563 determines which one of a plurality of stored filter coefficient sets will be used for anti-aliasing filtering purposes during scan conversion. For example, setting the control 563 to the first, i.e., the left most of tick marks 565 results in the use of the first set of red, green and blue filter coefficients, setting the control 563 to the second of the tick marks results in the use of the second set of red, green and blue filter coefficients and so on, with the setting of the control 563 to the right most tick mark 565 results in the use of the fifth set of red, green and blue filter coefficients.

By storing sets of filter coefficients and selecting the set to be used in response to the setting of slider 562, a user is provided with the ability to adjust multiple filter coefficients and thus control the shape and response of the anti-aliasing filters associated with each of the red, green and blue pixel sub-components. Significantly, the slider allows the user to adjust multiple filter coefficients through the use of a single somewhat intuitive adjustment which produces predictable results. Such an approach to providing a user some control over the selection of filter coefficients is more practical than allowing the user direct control over individual filter coefficients since separate control over multiple individual coefficients makes it difficult for a user to predict the effect on images of various filter coefficient combinations.

Having discussed the generation and use of user profiles, the creation and use of display device profiles will now be described.

Figure 9:
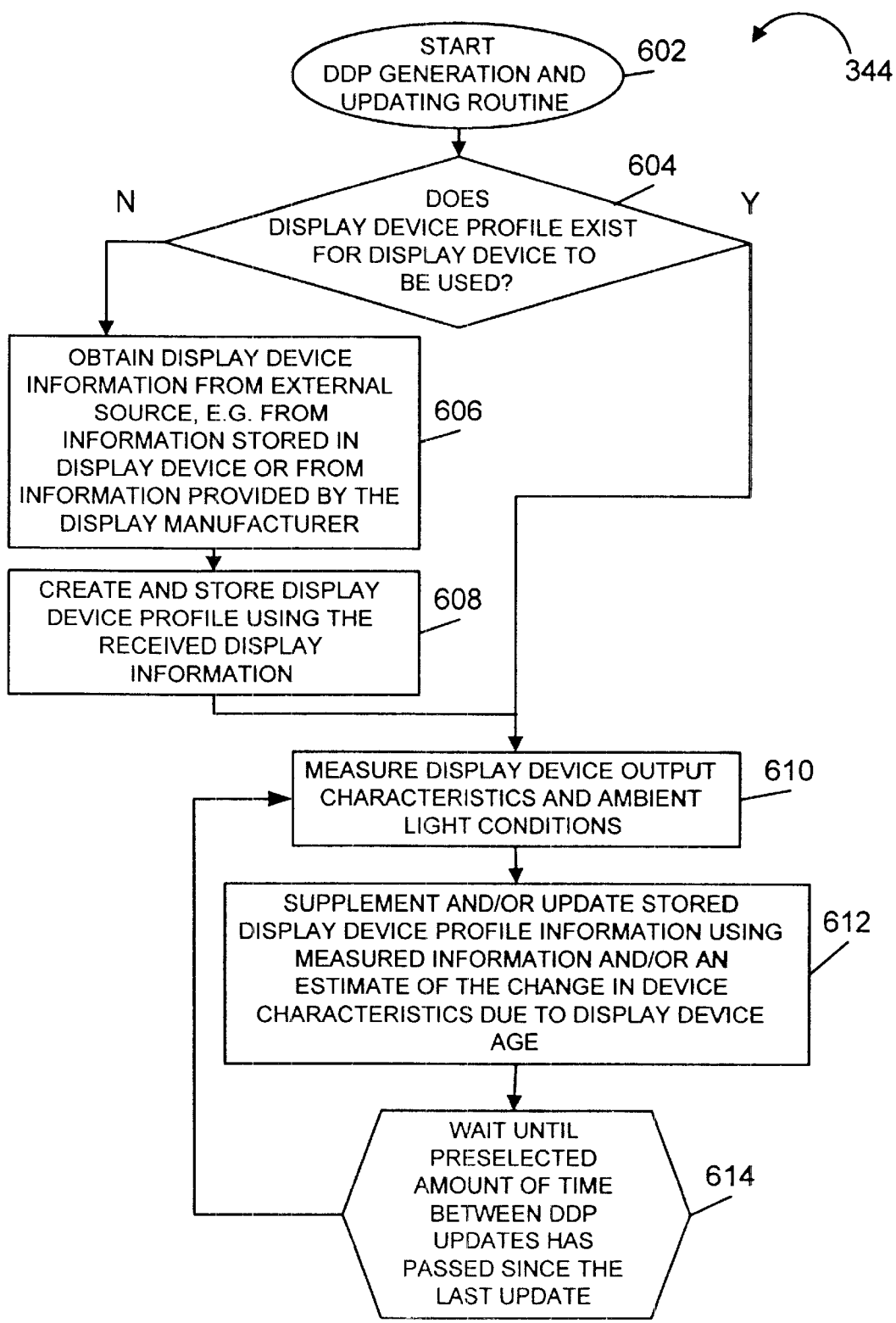
FIG. 9 illustrates an exemplary display device profile generation and updating routine.

The display device profiles 348, 350, which are included in the set of display device information 345, are generated by the display device profile (DDP) generation and updating routine 344. The DDP generation and updating routine 344 is illustrated in detail in FIG. 9.

As illustrated, the DDP generation and updating routine 344 begins in start step 602, e.g., when the computer system 200 is initially turned on and the routine 344 is executed by the processor 221. From step 602, operation proceeds to step 604, wherein a determination is made as to whether or not a display device profile already exists for the display device to be used, e.g., in display information set 345.

If, in step 604, it is determined that a display profile does not already exist, operation proceeds to step 606. In step 606, display device information used in the profile is obtained from an external source, e.g., from DDP information 246 stored in the display device 254 or from information provided by the display device manufacturer, e.g., on a floppy disk 229. The obtained information may include, e.g., the display device's date of manufacture, display type information, the display's gamut, white point and gamma value as determined by the device manufacturer, pixel pattern information, resolution information, information on the physical shape of display elements, and/or the display device's method of light modulation. In step 608, a display device profile is generated from the received display device information and stored in memory, e.g., as one of the DDPs 348 or 350. Arrow 247 of FIG. 3 represents the generation and storage of a DDP from display device profile information 246 obtained from display device 254 under direction of the DDP generation and updating routine 344.

Referring once again to FIG. 9, it can be seen that operation proceeds from step 606 to step 610.

In step 604, when it is determined that a display device profile already exists for the display device to be used, operation proceeds directly to step 610.

In step 610 display device output characteristics and ambient light conditions are measured, e.g., using sensor 108 which can be positioned to first measure screen light output and then to measure ambient light conditions.

From step 610, operation precedes to step 612 wherein the existing stored display device profile information is updated and/or supplemented using information obtained from the measurements made in step 610 and/or one or more estimates of changes in display device characteristics due to display device age. This may involve, e.g., substituting measured or estimated white point, gamma, and/or gamut values for the original values supplied, e.g., by the device manufacturer. Information about measured ambient light conditions may be added to the device profile or updated as part of the device profile updating performed in step 612. In cases where some display device values which may be affected by age are not measured, in step 612, they are updated using estimation techniques.

Display age information may be obtained by subtracting display device installation information maintained by the operating system from current date information also maintained by the operating system. Alternatively, it can be obtained using date of manufacture information included in the original display device profile. Calculations of changes in gamma and/or gamut values, for example, may be made based on the amount of time the display device has been in use when actual measurements are not available.

With the updating of the display profile information in step 612 complete, operation proceeds to step 614. Step 614 is a delay (waiting) step. In step 614, the DDP generation and updating routine waits until a preselected period of time has passed since the last DDP update which occurred in step 612 has passed. Operation then proceeds from step 614 to step 610. Thus, step 614 provides a mechanism for controlling the periodic updating of the DDP information as a function of a preselected, e.g., user or operating system manufacturer, specified period of time between DDP information updates.

Having described the generation, content, and updating of the DDPs 348, 350 and user profiles 354, 356, the use of the display and user profiles to generate display images will now be described with reference to FIG. 10.

Figure 10:
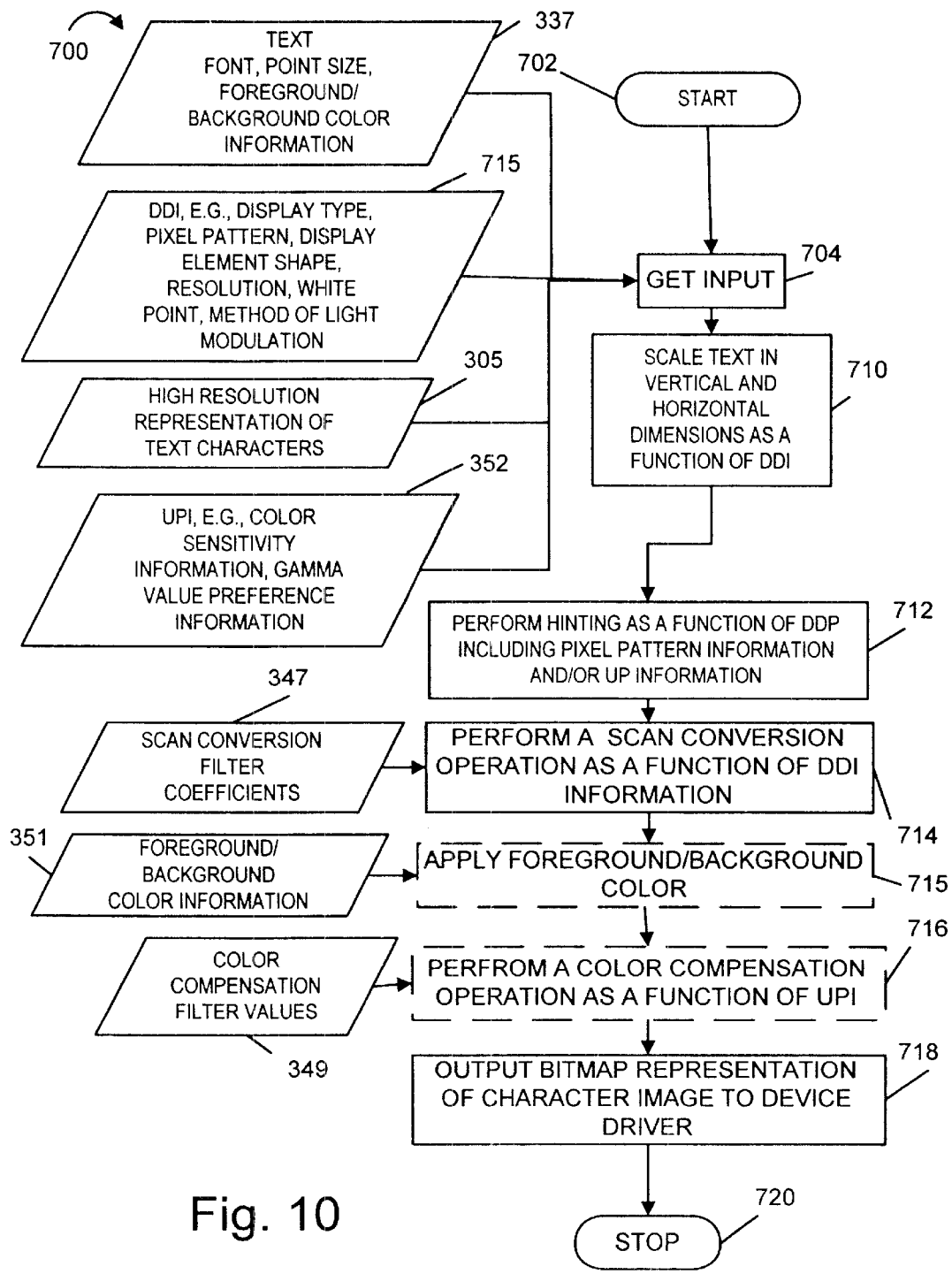
FIG. 10 illustrates the steps performed by an exemplary graphics display interface when rendering text in accordance with the present invention.

FIG. 10 illustrates a routine 700 for displaying images such as text, in accordance with the present invention. The routine 700 starts in step 702, wherein the scaling, hinting, scan conversion and color compensation sub-routines 308, 310, 312, 370 are loaded into memory.

Then, in step 704, input utilized in generating the images to be displayed is obtained. The input includes text information 337 output by application 236. The text information includes information identifying the text characters to be displayed, the font to be used, the text point size to be used and background/foreground color information. The input also includes display device information 715 which includes the display device profile 348, 350, discussed in detail above, for the display device which will be used to display the generated images. A high resolution representation of text characters, e.g., an outline font file stored as part of the operating system 235 also serves as input to step 704. The outline font file 305 may include scalable character outlines represented using lines, points and curves as well as character spacing information. The operating system identifies to the routine 700 the user who is logged into the computer system 200 at any given time. Additional input obtained in step 704 includes user profile information 352 which includes the user profile 354 or 356 of the user who is logged into the computer system 200 at the time the images are being processed for display. The contents of the user profile 354 or 356, associated with the user who is logged into the computer system 200, are used, e.g., by the color compensation sub-routine 370, when processing images for display. The input obtained in step 704 is available for use by any one of the sub-routines 308, 310, 312, 370.

For purposes of explanation, it will be assumed that the information in DDP 348 and user profile 354 are used by the routine 700 to generate the images to be displayed.

Once the input is obtained in step 704, operation proceeds to step 710 where a scaling operation is performed on the text to be rendered as a function of the DDP information obtained in step 704. Display type information, e.g., LCD or CRT, pixel pattern, e.g., vertical or horizontal striping information, element shape information, e.g., rectangular or square, and/or resolution, e.g., dot pitch, information are used to determine the appropriate type of scaling to be performed. In accordance with one embodiment of the present invention, scaling is performed for CRT displays at equal rates in the horizontal and vertical dimensions. However, for LCD displays, scaling in the horizontal and vertical directions depends on pixel sub-component shape and, in the case of striped displays, on the direction of striping. Super-sampling may be performed as an alternative to the described scaling followed by sampling.

In accordance with the present invention, scaling of text to be displayed on striped LCD displays is performed as a function of the point size and resolution information in a direction perpendicular to the direction to striping, e.g., at a rate greater than the rate of scaling performed in the direction of striping. The difference in amount of scaling between the direction perpendicular to the direction of striping and parallel to the direction of striping is normally equal to or greater than the number of pixel sub-components per pixel.

Figure 11:
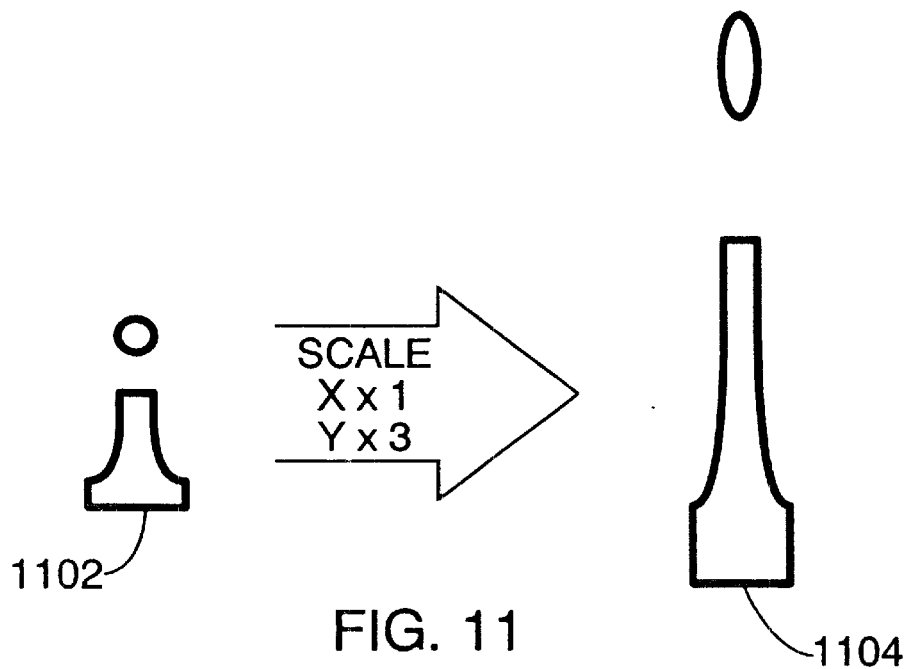
FIGS. 11 and 12 illustrate exemplary scaling operations performed in accordance with the present invention.

FIG. 11 illustrates an exemplary scaling of a character outline 1102 performed when the display device profile information indicates that the display device being used is an LCD display with pixels comprised of rectangular RGB pixel sub-components, which are ⅓ as tall as they are long, arranged to form RGB stripes extending in the horizontal direction. Note that scaling in the vertical direction is performed at a rate 3 times the scaling performed in the horizontal direction to produce the scaled character outline 1104.

Figure 12:
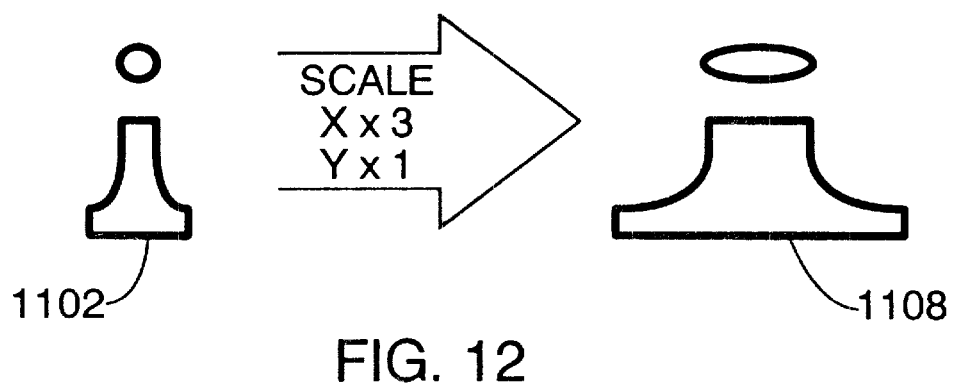

FIG. 12 illustrates exemplary scaling of the character outline 1102 performed when the display device profile information indicates that the display device being used is an LCD display with pixels comprised of rectangular RGB pixel sub-components, which are ⅓ as long as they are tall, arranged to form RGB stripes extending in the vertical direction. Note that scaling in the horizontal direction is performed at a rate 3 times the scaling performed in the vertical direction to produce the scaled character outline 1108.

Scaling performed for CRT displays, in accordance with one embodiment of the present invention, unlike the scaling performed for striped LCD displays, is performed at a uniform rate in both the horizontal and vertical dimensions.

After scaling in step 710, the data representing the scaled image is processed, in step 712 to perform a hinting operation as a function of display device profile information. Utilized device profile information includes display type, pixel pattern information and/or display resolution information. In the case of LCD displays, hinting is also performed as a function of pixel sub-component boundaries and/or a user's indicated preference for resolution vs. color accuracy. Hinting of images for display on CRT display, in one embodiment, is not performed as a function of pixel sub-component boundaries but rather pixel boundaries. The term grid-fitting is sometimes used to describe the hinting process.

Hinting operations performed for characters intended to be displayed on LCD displays are illustrated in FIGS. 13, 14, 15 and 16. Solid lines in the grids 1302, 1404, 1502, 1604 used in FIGS. 13, 14, 15 and 16, respectively, are used to illustrate pixel boundaries while dotted lines are used to illustrate pixel sub-component boundaries. The letters R, G, B are used to indicate portions of the grid which correspond to red, green and blue pixel sub-components of a display device, respectively. C1, C2, C3, C4 are used to indicate pixel columns 1 through 4.

Figure 13:
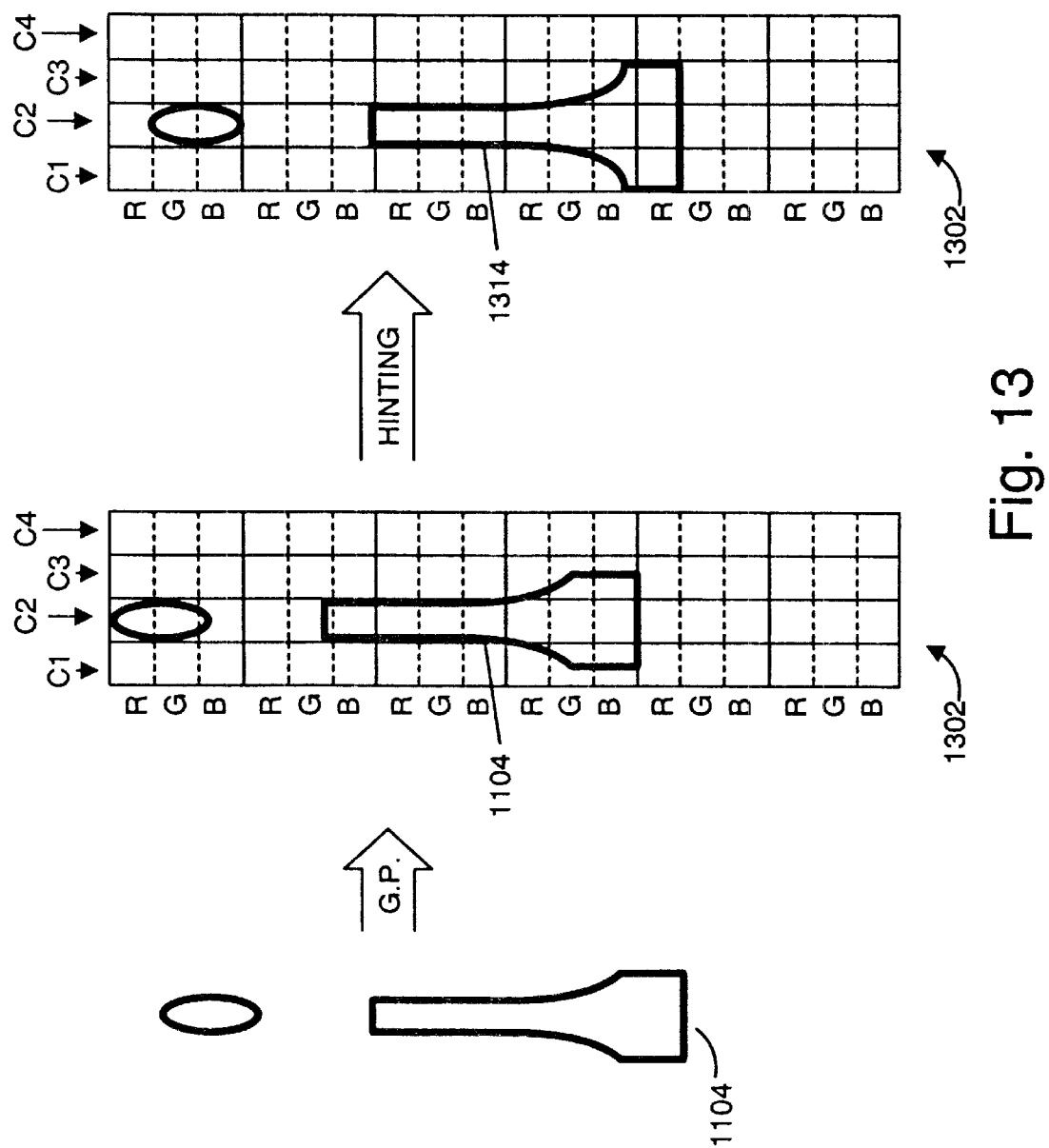
FIGS. 13, 14, 15 and 16 illustrate hinting operations performed in accordance with the present invention.
Figure 14:
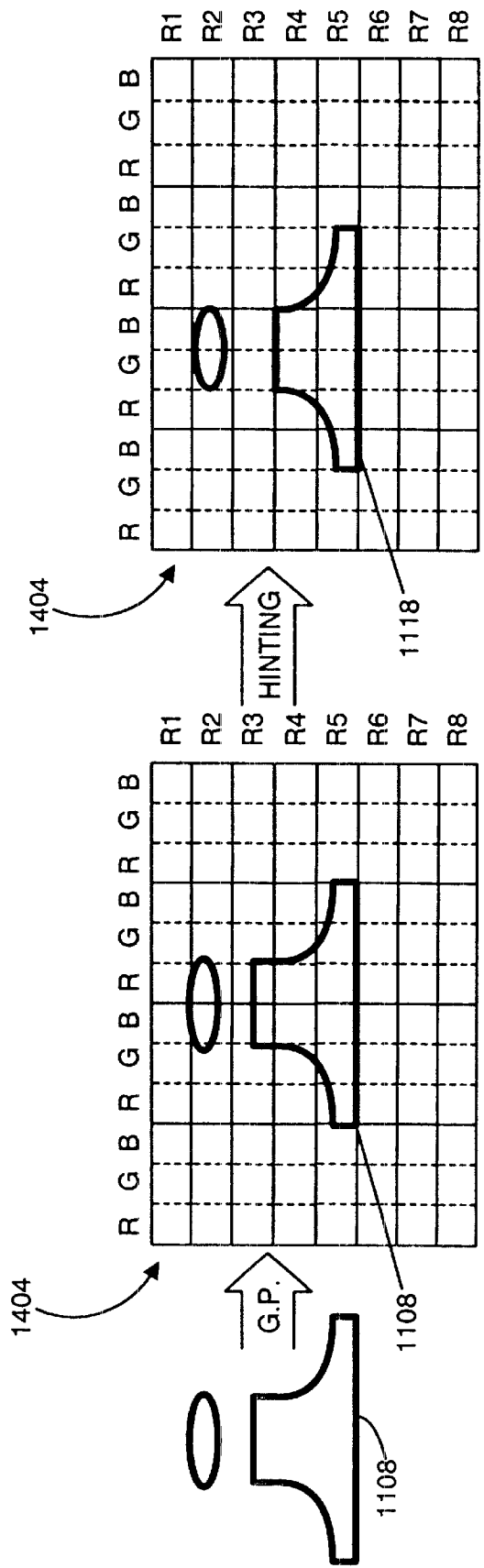

FIG. 13 illustrates the hinting of the scaled character outline 1104 which is intended to be displayed on an LCD display with horizontal striping in the case where a user has indicated that color accuracy is preferred over image resolution. FIG. 14 illustrates the hinting of the scaled character outline 1108 which is intended to be displayed on an LCD monitor with vertical striping in the case where a user has indicated that color accuracy is preferred over image resolution. The user's preference for color accuracy vs. image resolution is determined from the user profile information 354.

Figure 15:
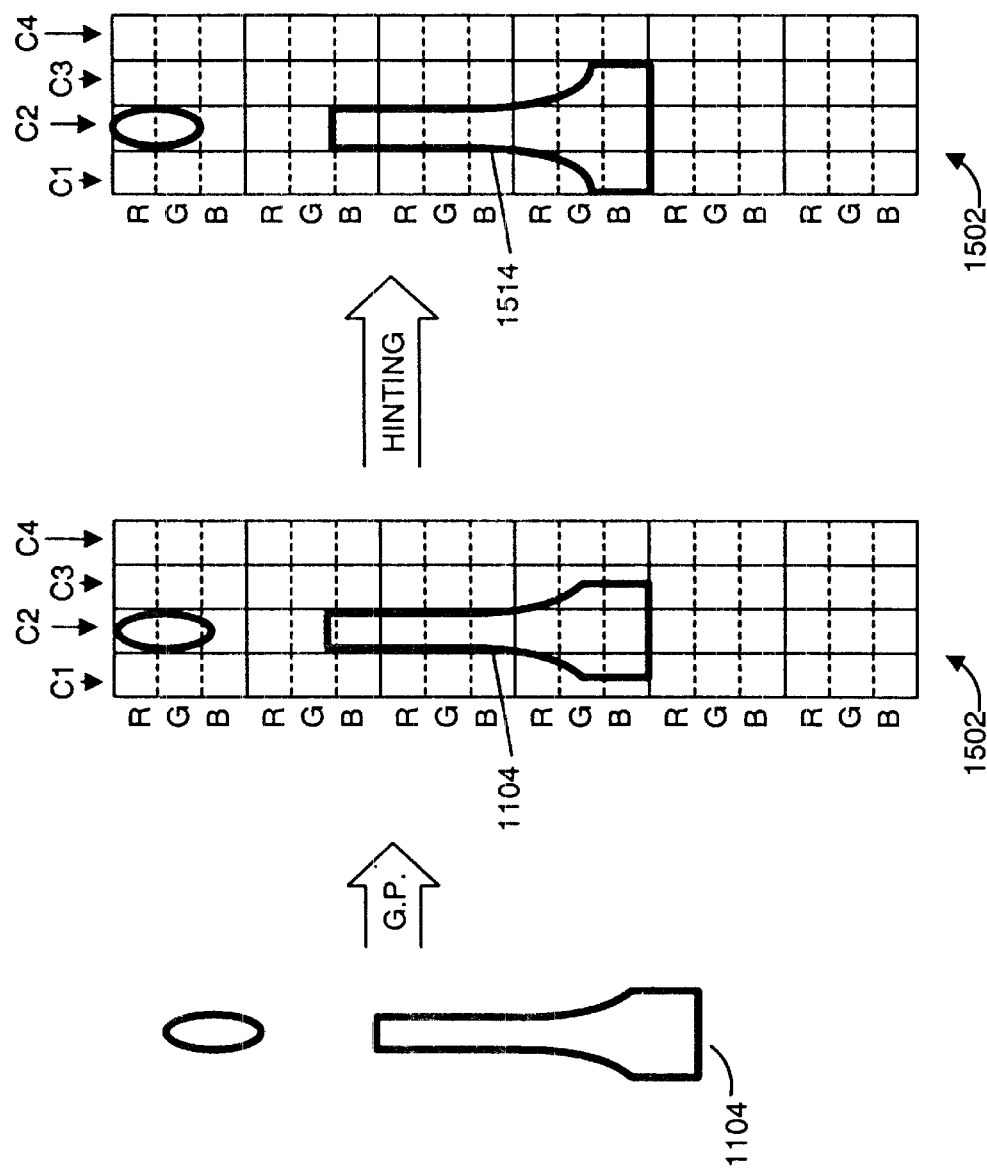
Figure 16:
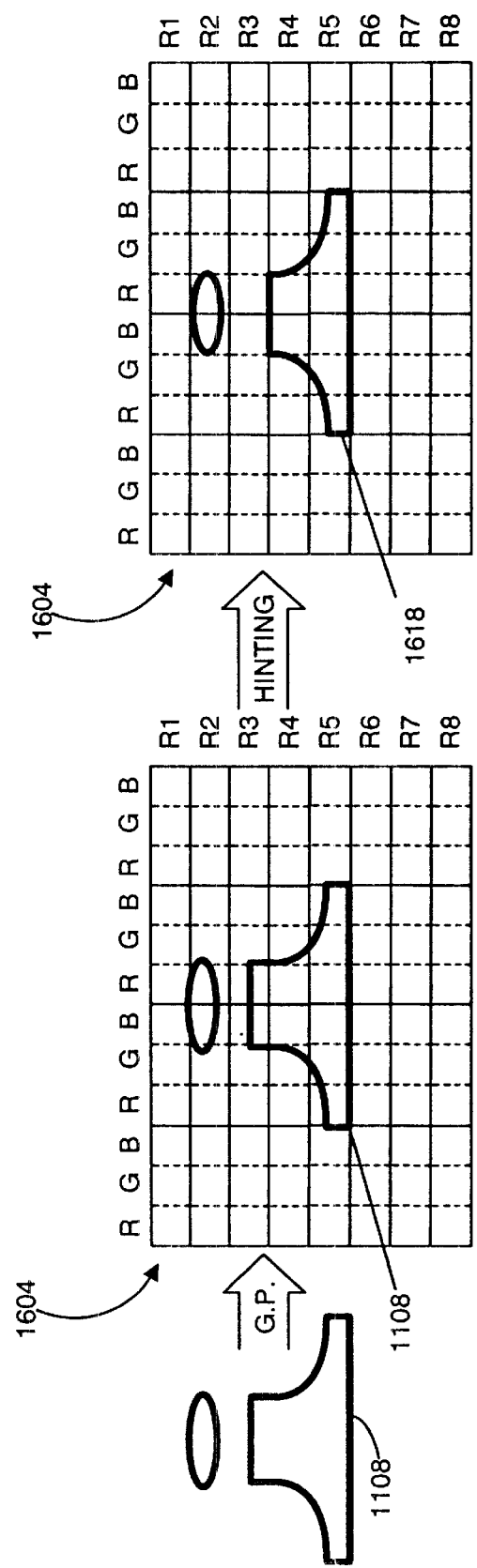

FIG. 15 illustrates the hinting of the scaled character outline 1104 which is intended to be displayed on an LCD display with horizontal striping in the case where a user has indicated that image resolution is preferred over color accuracy. FIG. 16 illustrates the hinting of the scaled character outline 1108 which is intended to be displayed on a LCD monitor with vertical striping in the case where a user has indicated that image resolution is preferred over color accuracy. The user's preference for color accuracy vs. image resolution is determined from the user profile information 354.

Hinting involves the alignment of a scaled character including, e.g., the character outline 1004, 1008, within a grid 1302, 1404, 1502, or 1604 that is used as part of a subsequent scan conversion operation. It also involves the distorting of character outlines so that the image better conforms to the shape of the grid. The grid is determined as a function of the physical shape, size and arrangement of a display device's pixel elements as indicated in accordance with the present invention by the DDP information.

When hinting for LCD displays, the present invention treats pixel sub-component boundaries as boundaries along which characters can and should be aligned or boundaries to which the outline of a character should be adjusted.

Hinting, implemented in accordance with the present invention as a function of pixel sub-component boundaries, can be used to reduce color distortions, e.g., color artifacts, that may be introduced as the result of treating each of the different color pixel sub-components as an independent luminous intensity source.

Adjusting the placement of an edge, e.g., as part of the hinting process, can have a significant effect in terms of reducing or eliminating color artifacts. For frequently used individual images, e.g., characters, edge placement information can be determined by a skilled typographer and stored in memory as part of the font information used for character generation. Hinting to reduce color errors in the case of LCD displays can reduce the display resolution since the position of the outline is adjusted to reduce color errors as opposed to optimizing character spacing and resolution. Thus, in accordance with one embodiment of the present invention hinting to reduce color errors is avoided or performed to reduce large color errors when the user profile 354 indicates a preference for resolution over color accuracy.

During the hinting operation, character outlines are aligned with various pixel and pixel sub-component boundaries according to stored, generally applicable hinting rules which, in accordance with the present invention are applied a function of information included in the DDP 348 and/or the user profile 354.

The hinting process of the present invention applied in the case of striped LCD displays involves aligning the scaled representation of a character within the grid, e.g., along or within pixel and pixel sub-component boundaries in a manner intended to optimize the accurate display of the character using the available pixel sub-components. In many cases, this involves aligning the left edge of a character stem with a left pixel or sub-pixel component boundary and aligning the bottom of the character's base along a pixel component or sub-component boundary.

Experimental results have shown that in the case of vertical striping, characters with stems aligned so that the character stem has a blue or green left edge generally tend to be more legible, to people able to detect colors, than characters with stems aligned to have a red left edge. Accordingly, in embodiments where hinting is performed to reduce color errors, e.g., because a user has expressed a preference for color accuracy over resolution, during hinting of characters to be displayed on a screen with vertical striping, blue or green left edges for stems are favored over red left edges as part of the hinting process.

In the case of horizontal striping, characters aligned so that the bottom of the character base has a red or blue bottom edge generally tend to be more legible, to people able to detect colors, than characters with bases aligned to have a green bottom edge. Accordingly, in embodiments where hinting is performed to reduce color errors, e.g., because a user has expressed a preference for color accuracy over resolution, during hinting of characters to be displayed on a screen with horizontal striping, red or blue bottom edges are favored over green bottom edges as part of the hinting process.

In cases where a user has indicated a preference for image resolution over color accuracy, the color of edges of charter outlines is ignored and hinting is performed to optimize character spacing and shape.

FIG. 13 illustrates the application of a hinting operation to the scaled image corresponding to outline 1104 is to be displayed on an LCD display with horizontal striping and where the user has indicated a preference for color accuracy over resolution. As part of the hinting process, the scaled image 1104 is placed on a grid 1302 and its position and outline are adjusted to better conform to the grid shape and to achieve a desired degree of character spacing. The letters "G.P." in FIGS. 13–16 indicate the grid placement step while the term hinting is used to indicate the outline adjustment and character spacing portions of the hinting process.

Note that in FIG. 13 where the image 1104 is hinted for display on a screen having horizontal striping taking into consideration color errors, the scaled image 1104 is positioned along the R/G pixel sub-component boundary so that the base of the character represented by character outline 1302 will have a red bottom edge. The shifting of the image outline so that the displayed character will have a red bottom edge represents a color correction operation. In addition to character outline positioning, the image's outline is adjusted so that rectangular portions of the image adjoin pixel sub-component boundaries. This results in the hinted character outline 1314. The distance between the character outline 1314 and left and right side bearing points (not shown) used for determining character position and spacing on the screen are also adjusted as a function of pixel sub-component boundaries. Thus, in various LCD embodiments of the present invention, character spacing is controlled to a distance corresponding to the width of a pixel sub-component, e.g., 1/3 of a pixel width.

FIG. 14 illustrates hinting of the image outline 1108 for display on a LCD display having vertical striping for a user who has indicated a preference for color accuracy over image resolution. In FIG. 14, the scaled character outline 1108 is positioned along the R/G pixel sub-component boundary so that the left edge of the stem of the hinted character 1118 has a green left edge. The shifting of the character outline 1108 to provide the stem with a green left edge represents a color correction operation. In addition to character outline positioning, the shape of the character outline 1108 is also adjusted.

FIG. 15 illustrates the hinting of the character outline 1104 for display on an LCD display with horizontal striping in the case where the user has indicated a preference for resolution over color accuracy. In the FIG. 15 example color correction steps are not performed as part of the hinting processes. Note that in the FIG. 15 example, the color of the bottom character edge is not used in determining character outline position during the hinging process. Thus, the character image will have a blue bottom edge due to the positioning of the hinted character outline 1514 as opposed to a red bottom edge as in the case of the FIG. 13 example.

FIG. 16 illustrates the hinting of the character outline 1108 for display on an LCD display with vertical striping in the case where the user has indicated a preference for resolution over color accuracy. In the FIG. 16 example color correction steps are not performed as part of the hinting processes. Note that in the FIG. 16 example, the color of the character stem left edge is not used in determining character outline position during the hinting process. Thus, the character image will have a blue stem left edge due to the positioning of the hinted character outline 1618 as opposed to a green stem left edge as in the case of the FIG. 14 example.

Referring once again to FIG. 10, after hinting is performed in step 712, a scan conversion operation is performed on the scaled hinted image which includes a character outline. In accordance with the present invention, scaling is performed as a function of information included in the display device profile 348 and/or user profile 354.

Figure 17:
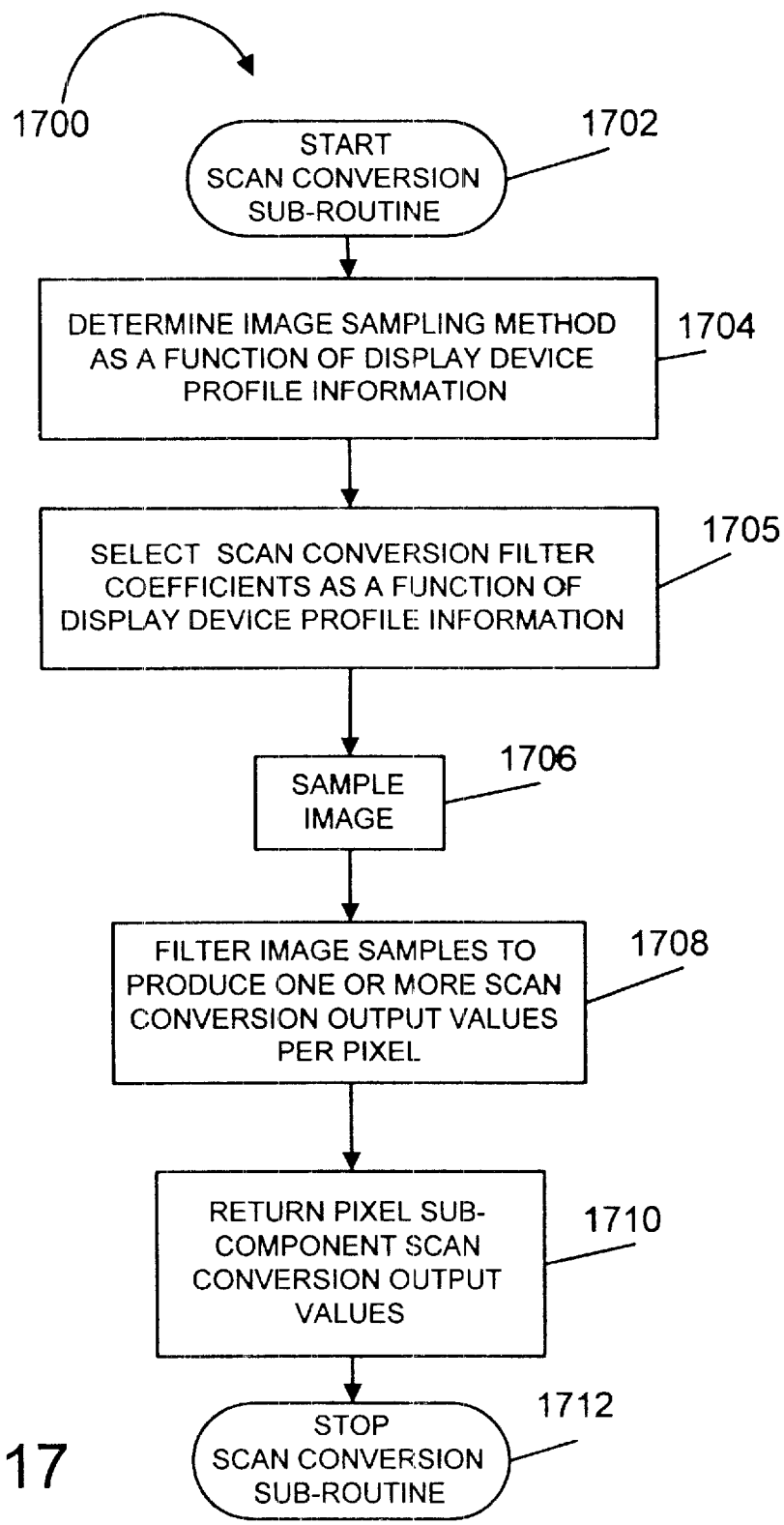
FIG. 17 illustrates a scan conversion sub-routine of the present invention.

Scan conversion step 714 is performed, in an exemplary embodiment, through a call to scan conversion sub-routine 1700 illustrated in FIG. 17. Sub-routine 1700 will be discussed in detail below. Scan conversion step 714 generates a bitmap representation of the image to be rendered. That is, the output of scan conversion step 714 includes separate scan conversion output values corresponding to each pixel or pixel sub-component used to represent an image.

In accordance with the present invention, in the case of RGB striped LCD displays, a scan conversion output value is generated per pixel sub-component, e.g., 3 scan conversion output values are generated per pixel. The scan conversion output values may be used as blend coefficients. Alternatively, the scan conversion output values can, in LCD embodiments, be treated as pixel sub-component luminous intensity level values that can fall within a range extending from a luminous intensity value used to specify the minimum light output of a pixel sub-component and the maximum light output of a pixel sub-component. Assuming a black foreground, the minimum luminous intensity value, e.g., 0, would correspond to an "on" pixel sub-component. Assuming a maximum luminous intensity value of 255, and a white background, an "off" scan conversion output value would correspond to the value 255. Values in between 0 and 255 indicate pixel sub-components which correspond to part foreground and part background.

In the case where the scan conversion output values are treated as blend coefficients, user foreground and background color selections are applied by the device driver 371 using alpha blending techniques and operation proceeds directly from step 714 to step 718.

In the case where the scan conversion output values are treated as pixel sub-component luminous intensity levels, the scan conversion output values are processed in step 715 to apply foreground and background color selections and then a color compensation operation is performed, in step 716 as a function of the user's expressed preference regarding resolution vs. color accuracy. A user's preference may, at least in part, be driven by categories of color vision deficiency such as varying degrees of difficulty distinguishing between red and green shared by a considerable percentage of the adult male population. Steps 715 and 716 are illustrated using dashed lines since they are skipped in embodiments where the scan conversion output values are treated as blend coefficients.

In step 715, the foreground and background color information 351 is used to apply foreground and background color selections to scan conversion output values, each of which corresponds to a R, G, or B pixel sub-component in the case of an RGB striped display. The foreground color is specified in the set of color information 351 as red, green, and blue pixel sub-component luminous intensity values $R_F$, $G_F$, and $B_F$ which, when used to control the red, green and blue foreground pixel sub-components of a pixel, respectively, produce a foreground colored pixel. Similarly, the background color is specified in the set of color information 351 as red, green, and blue background pixel sub-component luminous intensity values $R_F$, $G_F$, and $B_F$ which, when used to control the red, green and blue pixel sub-components of a pixel, respectively, produce a background colored pixel.

In step 715, pixel sub-component scan conversion output values corresponding to either a foreground or a background color are replaced with the corresponding foreground or background pixel sub-component luminous intensity value. For example $R_B$ would be substituted for a red pixel sub-component scan conversion output value of 0, $G_B$ would be substituted for a green pixel sub-component scan conversion output value of 0, and $B_B$ would be substituted for a blue pixel sub-component scan conversion output value of 0. Assuming the maximum scan conversion output value is 255 and that this value indicates a foreground colored pixel sub-component, $R_F$ would be substituted for a red pixel sub-component scan conversion output value of 255, $G_F$ would be substituted for a green pixel sub-component scan conversion output value of 255, and $B_F$ would be substituted for a blue pixel sub-component scan conversion output value of 255. For purposes of simplicity of implementation, scan conversion output values falling between 0 and 255 may be clamped to the corresponding closer one of the foreground or background pixel sub-component luminous intensity level values. For example, R, G, and B pixel sub-component scan conversion output values of 85 may be set to pixel sub-component luminous intensity level $R_B$, $G_B$, $B_B$, respectively. In addition, R, G, and B pixel sub-component scan conversion output values of 170 may be set to pixel sub-component luminous intensity level $R_F$, $G_F$, $B_F$, respectively.

As opposed to clamping pixel sub-component luminous intensity values to a foreground or background pixel sub-component luminous intensity value, it is possible to set them to a value in between the foreground and background luminous intensity values as a function of the scan conversion output value.

However, by limiting pixel sub-component luminous intensity values to foreground or background pixel sub-component luminous intensity values, the number of potentially distracting color errors can be significantly reduced at some expense in terms of resolution.

Regardless of how the foreground and background colors are applied to produce pixel sub-component luminous intensity values, distracting color errors may occur as the result of the use of displaced samples during scan conversion. Whether a color error is distracting or not is a function of the user's sensitivity to color. Since color error reduction is usually at the expense of image resolution, color compensation may be skipped or minimized for users who are not sensitive to color errors or who have indicated a preference for resolution vs. color accuracy.

Figure 21:
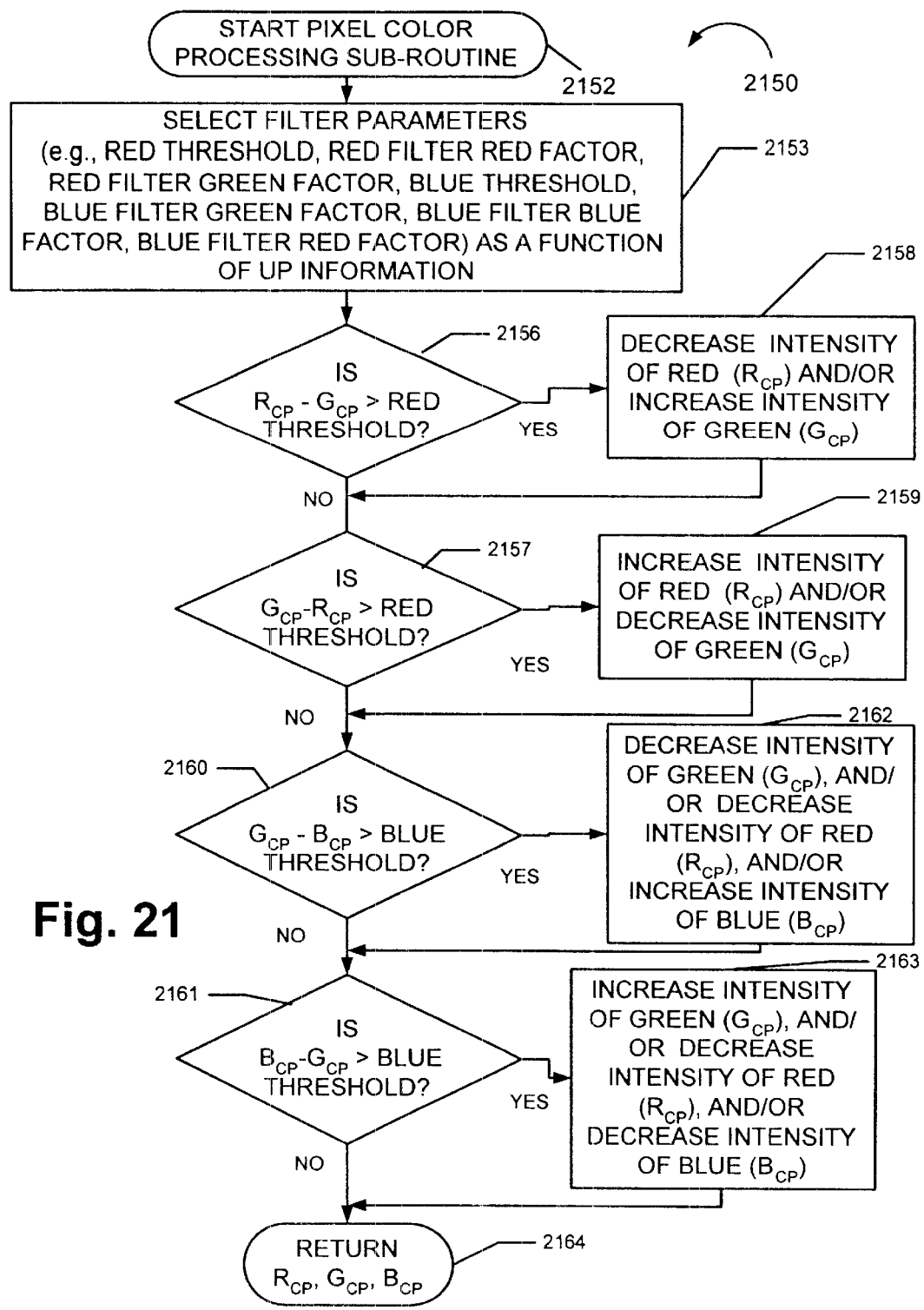
FIG. 21 illustrates a pixel color processing sub-routine suitable for performing color correction operations in accordance with the present invention.

Color compensation step 716 is performed on the data, representing a bitmapped image, output by step 715. Color compensation filter values are selected from the set of values 349 as part of step 716. The selection of filter values is made based on a user's preference for resolution vs. color accuracy as indicated by information in the user profile 354. A color compensation sub-routine 2150, illustrated in FIG. 21, is suitable for performing color compensation step 716. Color compensation sub-routine 2150 will be discussed in detail below.

In both the case where scan conversion output values are treated as blend coefficients and the case where scan conversion output values are treated as pixel sub-component luminous intensity levels, the scan conversion filter may be selected so that it performs both anti-aliasing and color compensation filtering functions. In such embodiments, the scan conversion filter coefficients, which include multiple coefficients, are selected both as a function of the device profile information and the user preference information. Accordingly, in such embodiments, multiple scan conversion filter coefficients are selected from a single value, e.g., slider position setting, indicating a user's preference for resolution vs. color accuracy. After the color compensation operation is performed in step 716 operation proceeds to step 718.

In step 718, the generated data representing the bitmap representation of the image to be displayed, produced by step 716 or, alternatively, step 714 when steps 715 and 716 are omitted, is output to the device driver for further processing. Operation of the routine 700 then stops in step 720 pending a new call to the routine 700, e.g., by the operating system.

Exemplary scan conversion and color compensation operations will now be discussed in detail.

FIG. 17 illustrates an exemplary scan conversion sub-routine 1700 suitable for implementing scan conversion step 714 of routine 700. Scan conversion sub-routine 1700 begins in step 1702 wherein it starts executing. Then in step 1704, a determination is made, using information in the display device profile 348, as to the image sampling method to be used. Determining the image sampling method involves, e.g., selecting the sampling rate in the horizontal and/or vertical directions to be used when sampling the image represented by the hinted image outline.

For example, in one embodiment, when the DDP 348 indicates that a CRT display is being used, a sampling method which involves sampling the image in the horizontal and vertical dimensions at the same rate is used. In one such embodiment, R, G, B pixel sub-component luminous intensity values for a pixel of a CRT display are generated from samples, e.g., samples obtained by sampling the scaled hinted image at a rate of four samples per pixel in both the horizontal and vertical dimensions.

When the DDP 348 indicates that an LCD display with RGB horizontal striping is being used, the image is sampled at a rate in the vertical dimension which is three times greater than the rate in the horizontal dimension. In the same exemplary embodiment, when the DDP 348 indicates that an LCD display with RGB vertical striping is being used, the image including the hinted image outline is sampled at a rate in the horizontal dimension which is three times greater than the rate in the vertical dimension. Other sampling rates are also possible.

When the DDP 348 indicates that a striped LCD display is being used, different sets of character image samples are used to generate each scan conversion output value used to control the R, G, and B pixel sub-components of a pixel. Normally, in accordance with the present invention, different displaced image portions are used to generate the samples from which the scan conversion output values, corresponding to each LCD pixel sub-component of a pixel, are generated. The different image portions may, but need not be, over lapping image portions.

After the sampling method has been selected in step 1704, operation proceeds to step 1705 wherein a set of scan conversion filter coefficients, e.g., filter weights, are selected to implement filters used during a scan conversion filtering operation.

Different anti-aliasing filters may be implemented by selecting different sets of filter weights, sometimes referred to as filter coefficients. Exemplary anti-aliasing filters will be discussed below with regard to FIG. 19.

After selection of the filter coefficients, in step 1706, the image including the character outline representing foreground/background information, is sampled.

One or more known techniques may be used for sampling the image. In one embodiment, if the center of the grid segment being sampled is within the character outline, the sample is determined to be "on" and is set to a value of one. If the center of the grid segment being sampled is outside the character outline, the sample is determined to be "off" and set to a value of zero. An "on" sample indicates that the sample corresponds to the image foreground color while "off" indicates that the sample corresponds to the image background color.

The sample values generated in step 1706 are filtered in step 1708. In step 1708, an anti-aliasing filtering operation is performed on the image samples to produce one or more values indicative of the portion of each image region to which the scaled value corresponds that is due to the foreground color and the portion of the image region which is due to the background color. Accordingly, the output of the filtering operation may be used as a foreground/background blend coefficient sometimes referred to as an alpha value. Alternatively, as discussed above, it can be used as a luminous intensity level indicative of a luminous intensity value in the range extending from full "on" to full "off".

The scan conversion output values produced by filtering step 1708 are returned to the routine which initiated the call to the scan conversion sub-routine 1700. Operation of the routine 1700 is then stopped in step 1712 pending the processing of addition image data.

The scan conversion output values may be expressed as a value in a range, e.g., 0–3, having a fixed number of possible values. In such an embodiment each value in the range 0–3 represents one of four distinct blend coefficients (alpha values) or luminous intensity levels. For purposes of subsequent image processing operations, it is frequently convenient to process the scan conversion output values, corresponding to separate R, G, B pixel sub-components, as 8 bit values falling in the range of 0–255. Accordingly, in the exemplary embodiment the scan conversion output values produced by the scan conversion filtering step 1708 are, converted to the range of 0–255 prior to being returned in step 1710. The conversion operation may be included in routine 1700 as part of return step 1710 or as an additional step prior to step 1710. In such an embodiment, 0 would correspond to the minimum possible scan conversion output value, 255 to the maximum scan conversion output value, and values between 0 and 255 would correspond directly and proportionately to values between the minimum and maximum scan conversion output values.

While in the exemplary embodiment, the scan conversion output values for each pixel sub-component of an LCD display are set to a value between 0 and 255, it is contemplated that, in some embodiments, the scan conversion output values would not be immediately converted into 8 bit values but would be stored and/or processed in a compressed format. The use of a compressed format allows savings in both the amount of memory used to store the scan conversion output values and the bus bandwidth required to communicate the values. However, for purposes of explanation e.g., of the color compensation sub-routine 2150, it will be assumed that scan conversion output values are converted to values ranging from 0 to 255.

Having generally described the scan conversion sub-routine 1700, anti-aliasing filters suitable for use as scan conversion filters will now be described with regard to FIG. 18.

FIG. 18 illustrates exemplary anti-aliasing filters which are used to implement an exemplary anti-aliasing filtering operation as part of a scan conversion operation when the DDP information indicates that the display device is an RGB striped LCD display. Use of other filters as scan conversion filters is also possible, e.g., filters with more or less than three filter taps may be used.

In the FIG. 18 example, separate red, green and blue filters 1802, 1804, 1806 are used to generate the scan conversion output values used to control each of the red, green and blue pixel sub-components of a pixel. The filter input samples, in the FIG. 18 embodiment, are obtained from sampling the scaled, hinted character image including the character outline being processed, at a rate of three samples per pixel in the direction perpendicular to the direction of striping. At least some of the input samples supplied to each of the filters 1802, 1804 and 1806 will come from different image portions. Accordingly, the scan conversion output values generated by filters 1802, 1804 and 1806 correspond to different image portions.

Each filter 1802, 1804, 1806 comprises first, second and third multipliers 1803, 1805, 1807 and a summer 1809. Operation of the red scan conversion filter 1802 will be explained with the understanding that the green and blue scan conversion filters operate in a similar manner using different sets of input samples and possibly different filter coefficients.

First, second, and third input samples RS1, RS2, RS3 are supplied to the first second and third multipliers 1803, 1805 and 1807, respectively, and are multiplied by the first, second, and third red scan conversion filter coefficients RW1, RW2, RW3, respectively. In step 1805 of the exemplary scan conversion routine discussed above, the filter coefficients RW1, RW2, RW3 were selected from the stored scan conversion filter coefficients 347 as a function of the information included in the DDP 348.

The output of the first, second, and third multipliers 1803, 1805, 1807 is summed by the summer 1809 to produce a red pixel sub-component luminous intensity value. By selecting the filter coefficients RW1, RW2, RW3, to all be the same value, a square box filter is implemented.

Assuming the use of the value one for each of the filter coefficients and input sample values of 0 or 1, the outputs of the scan conversion filters 1802, 1804, 1806 may assume the values 0 through 3. 0 indicating a background colored pixel sub-component, three indicating a foreground color pixel sub-component and a value of 1 or 2 indicating a pixel sub-component corresponding to a mix between the foreground and background colors.

The green and blue scan conversion filters 1804, 1806 operate in the same manner as the red scan conversion filter 1802 to produce scan conversion output values used to control the luminous intensity level of green and blue pixel sub-components, respectively.

As discussed above, for purposes of subsequent image processing, the scan conversion output values 0–3 may be, and in this exemplary embodiment are, converted to the range of 0–255, e.g., as part of return step 1710 of routine 1700. In such an embodiment, output filter value 0 results in a 0 being returned as the scan conversion pixel sub-component output value, an output filter value of 1 results in the value 85 being returned as the scan conversion pixel sub-component output value, an output filter value of 2 results in the value 171 being returned as the scan conversion pixel sub-component output value, and the output filter value of 3 results in the value 255 being returned as the scan conversion pixel sub-component output value.

FIGS. 19 and 20 are pictorial representations of scan conversion operations performed on scaled hinted images intended to be displayed on LCD displays having horizontal RGB striping and vertical RGB striping, respectively. Note that FIG. 19 illustrates performing a scan conversion operation on the image which includes character outline 1014. FIG. 20 illustrates performing a scan conversion operation on the image which includes character outline 1018. In FIGS. 19 and 20, solid dots in grids 1102 and 1104 are used to indicate image samples while brackets are used to indicate the sets of samples which are supplied to each of the R, G, and B scan conversion filters illustrated in FIG. 18.

Note in the FIGS. 19 and 20 examples three samples are used to generate the scan conversion value corresponding to each pixel sub-component luminous intensity value. "On" samples corresponding to image foreground are illustrated in grids 1202 and 1203 as solid dots. Note that each grid segment of the grid 1202, 1203 includes between zero and three dots. Grid segments which include no "on" samples are shown in grids 1202, 1203 using specking to illustrate the different rows of red, green and blue pixel sub-components to which each grid segment corresponds. Light speckling is used to indicate correspondence to a blue pixel sub-component, medium specking is used to indicate correspondence to a red pixel sub-component and dark speckling is used to indicate correspondence to a green pixel sub-component.

Grids 1212 and 1214 are pictorial representations of the scan conversion output values generated by supplying the filter sample values illustrated in grids 1202, 1204 to the scan conversion filters illustrated in FIG. 18, assuming the use of filter coefficients of the value 1. In grids 1212, 1214, white indicates a scan conversion output value of 0, light speckling indicates a scan conversion filter output value of 1, medium speckling indicates a scan conversion output value of 2, and dark speckling indicates a scan conversion output value of 3. In FIGS. 18 and 19, a scan conversion filter output value of 0 indicates a background image area, a scan conversion filter output value of 3 indicates a foreground image area, a scan conversion filter output value of 1 indicates an image area which corresponds more to the background than the foreground, and a scan conversion filter output value of 2 indicates a scan conversion filter output value which corresponds more to the foreground than the background.

Having described the scan conversion process of the present invention in detail, a pixel color processing sub-routine 2150 suitable for implementing color compensation step 716 will now be described with reference to FIG. 21. Sub-routine 2150 is used to process the pixel sub-component luminous intensity values of each pixel of an image.

The sub-routine 2150 begins in step 2152 and proceeds to step 2153 wherein filter parameters are selected and loaded into memory. The filter parameters are selected from the set of color compensation filter values 349 as a function of user profile information 354 which indicates a user's preference for resolution vs. color accuracy. The user profile 348 of a user who is logged into the computer system executing the color compensation routine 2150 is used to provide the user preference information. In this exemplary embodiment, the filter parameters include thresholds which determine when a color correction operation is performed. The stronger the user preference for resolution over color accuracy, the higher the threshold values which are selected for determining when to perform a color correction operation. Other parameters, e.g., filter coefficients, used to control the amount of change in pixel sub-component luminous intensity values when a color correction operation is to be performed are also selected as a function of the user preference information. Filter coefficients which will produce a relatively small correction in detected color errors are selected when a user indicates a strong preference for resolution over color accuracy. However, when a user indicates a preference for color accuracy over resolution, filter coefficients which result in larger corrections in pixel sub-component luminous intensity values are selected.

Once the filter parameters are selected and loaded into memory, step 2153 may be skipped in future iterations of the sub-routine 2150 until such time as the user who is logged into the machine changes the user preference information or a new user logs into the computer system in place of the original user.

In sub-routine 2150, two (2) filters—namely a red filter and a blue filter are provided. In the exemplary embodiment, the red filter uses a red threshold, a red factor, and a green factor. The blue filter uses a blue threshold, a green factor, a blue factor, and a red factor. The red and blue filters may be implemented in stages. In the sub-routine 2150 the initials CP are used to indicate values associated with the current pixel being processed. For example $R_{CP}$ is used to indicate the pixel sub-component luminous intensity value of the red pixel sub-component of the current pixel being processed.

In decision step 2156, if it is determined that the difference between the red and green pixel sub-component luminous intensity values ($R_{CP}-G_{CP}$) of a pixel is greater than the red filter threshold value, operation proceeds to step 2158. In step 2158, the red pixel sub-component luminous intensity value ($R_{CP}$) is decreased and/or the green pixel sub-component luminous intensity value is increased. This step may be carried out in accordance with the following expressions: if ($R_{CP}-G_{CP}$)>Red Filter Threshold, then $$R_{CP}'=R_{CP}-((R_{CP}-G_{CP})*\text{Red Filter Red Factor})/10$$

$$G_{CP}'=G_{CP}+((R_{CP}-G_{CP})*\text{Red Filter Green Factor})/10$$

Set $R_{CP}=R_{CP}'$

Set $G_{CP}=G_{CP}'$ where $R_{CP}'$ is the updated red pixel sub-component luminous intensity value, and $G_{CP}'$ is the updated green pixel sub-component luminous intensity value.

Processing proceeds from step 2158 to decision step 2157. Operation proceeds directly from step 2156 to step 2157 if it is determined in step 2156 that the difference, between the red and green pixel sub-component luminous intensity values ($R_{CP}-G_{CP}$) of a pixel, is less than or equal to the red filter threshold value.

In decision step 2157, if it is determined that the difference between the green and red pixel sub-component luminous intensity values ($G_{CP}-R_{CP}$) is greater than the red filter threshold value operation proceeds to step 2159. In step 2159 the red pixel sub-component luminous intensity value ($R_{CP}$) is increased and/or the green pixel sub-component luminous intensity value is decreased.

Steps 2156, 2158, 2157 and 2159 in combination comprise a red filter which reduces the difference between the red and green pixel sub-component values when the magnitude of the difference between these values exceeds the red threshold.

Processing proceeds from step 2159 to decision step 2160. Operation proceeds directly from step 2157 to step 2160 if it is determined in step 2157 that the difference between the green and red pixel sub-component luminous intensity values ($G_{CP}-R_{CP}$) is less than or equal to the red filter threshold value.

In decision step 2160, if it is determined that the difference between the green and blue pixel sub-component luminous intensity values ($G_{CP}-B_{CP}$) is greater than the blue filter threshold value, operation proceeds to step 2162. In step 2162 the green pixel sub-component luminous intensity value ($G_{CP}$) is decreased, and/or the blue pixel sub-component luminous intensity value ($B_{CP}$) is increased, and/or the red pixel sub-component luminous intensity value ($R_{CP}$) is decreased. This step may be carried out in accordance with the following expressions:

if $(GCP-BCP)$>Blue Filter Threshold, then $$G_{CP}'=G_{CP}-((G_{CP}-B_{CP})*\text{Blue Filter Green Factor})/10$$

$$B_{CP}'=B_{CP}+((G_{CP}-B_{CP})*\text{Blue Filter Blue Factor})/10$$

$$R_{CP}'=R_{CP}-((G_{CP}-B_{CP})*\text{Blue Filter Red Factor})/10$$

SET $R_{CP}=R_{CP}'$

SET $G_{CP}=G_{CP}'$

SET $B_{CP}=B_{CP}'$ where $R_{CP}'$ is the modified red pixel sub-component luminous intensity value, $B_{CP}'$ is the modified blue pixel sub-component luminous intensity value and $R_{CP}'$ is the modified red pixel sub-component luminous intensity value.

Processing proceeds from step 2162 to decision step 2161. Operation proceeds directly from step 2160 to step 2161 if it is determined in step 2160 that the difference between the blue and green pixel sub-component luminous intensity values ($G_{CP}$–$B_{CP}$) is less than or equal to the blue filter threshold value.

In decision step 2161, if it is determined that the difference between the blue and green pixel sub-component luminous intensity values ($B_{CP}$–$G_{CP}$) is greater than the blue filter threshold value, operation proceeds to step 2163. In step 2163 the green pixel sub-component luminous intensity value ($G_{CP}$) is increased, and/or the red pixel sub-component luminous intensity value ($R_{CP}$) is decreased and/or the blue pixel sub-component luminous intensity value ($B_{CP}$) is decreased.

Steps 2160, 2162, 2161 and 2163 in combination comprise a blue filter which, in most embodiments, reduces the difference between the blue and green pixel sub-component values when the magnitude of the difference between these values exceeds the blue threshold.

Processing proceeds from step 2163 to return step 2164. Operation proceeds directly from step 2161 to step 2164 if it is determined in step 2161 that the difference between the blue and green pixel sub-component luminous intensity values ($B_{CP}$–$G_{CP}$) is less than or equal to the blue filter threshold value.

In return step 2164, the values $R_{CP}$, $G_{CP}$ and $B_{CP}$ are output or returned to the routine which called the pixel color processing sub-routine 2152. In this manner, filtered pixel sub-component luminous intensity values are returned.

Some exemplary values for FIG. 21 filter parameters or variables are:

Red Filter Threshold=100;
Red Filter Red Factor=3;
Red Filter Green Factor=2;
Blue Filter Threshold=128;
Blue Filter Red Factor=2;
Blue Filter Green Factor=1; and
Blue Filter Blue Factor=3.

In cases where a user indicates a strong preference for resolution over color accuracy, the filter thresholds would be higher. For example, the following filter threshold values might be used:

Red Filter Threshold=185;
Blue Filter Threshold=200.

By processing pixel sub-component luminous intensity values using the above described pixel color processing sub-routine, color errors can be reduced or eliminated.

The various routines which comprise the graphics display interface 302, e.g., rendering and rasterization routines 307, have been described in detail. The output of the graphics display interface 302 are bitmapped images represented, in the case of an LCD display embodiment, using either alpha values, e.g., one per pixel sub-component, or as pixel sub-component luminous intensity values.

The bitmapped images output by the graphics display interface 302 are supplied to the device driver 371 for further processing. Operation of the device driver 371 will now be discussed in detail with reference to FIG. 22.

Figure 22:
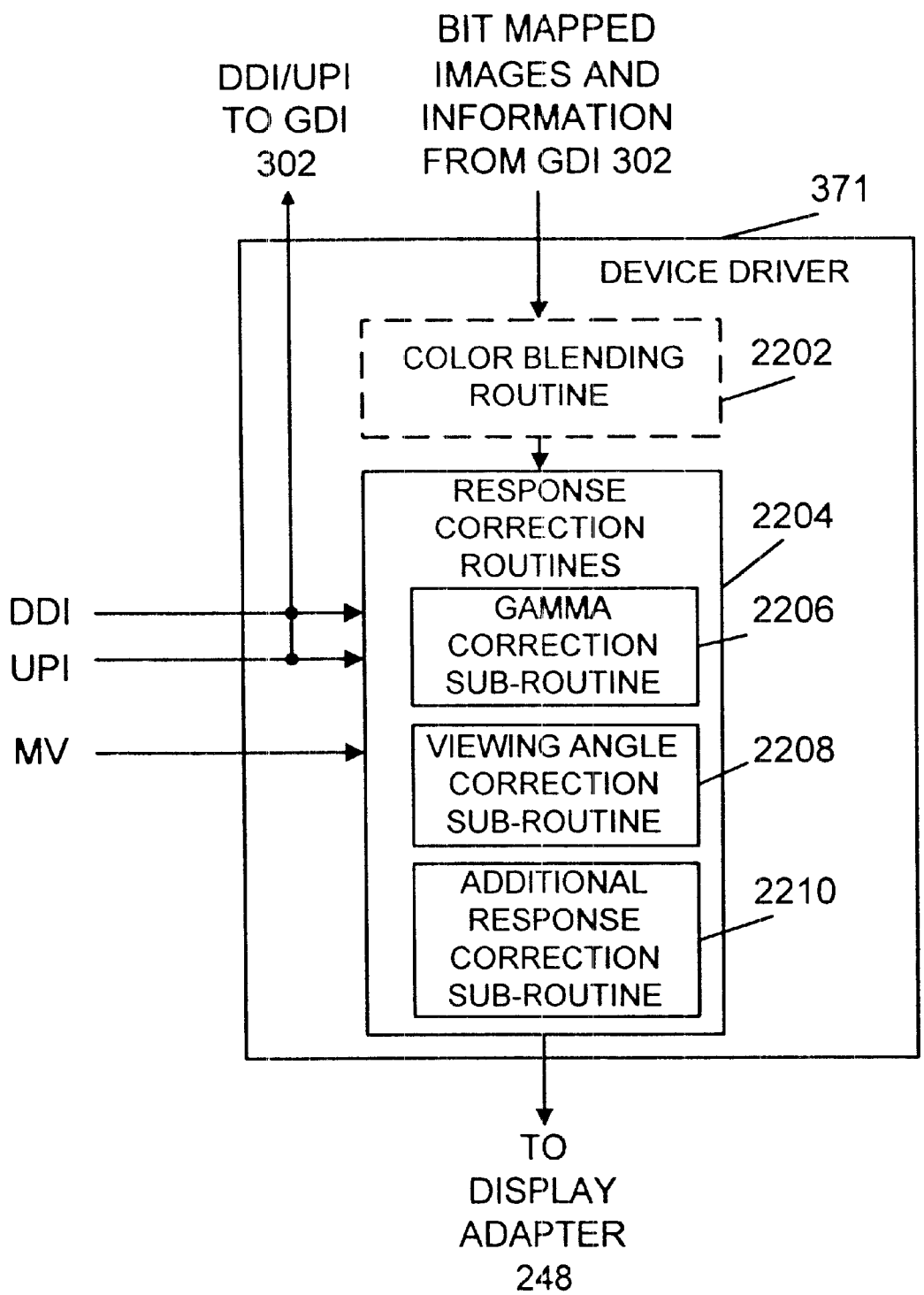
FIG. 22 illustrates routines used to implement a device driver in accordance with one embodiment of the present invention.

As illustrated in FIG. 22, the device driver 371 includes a plurality of routines including a color blending routine 2202 and a set of response correction routines 2204. The response correction routines 2204 included a gamma correction sub-routine 2206, a viewing angle correction sub-routine 2208 and an additional response correction sub-routine 2210.

The device driver 371 receives as its input the bit mapped images and other information, e.g., foreground/background color information, from the GDI 302. It also receives display device profile information, e.g., the information in DDP 348, for the display device being used. User profile information, e.g., UPI 354, for the user who is logged into the computer system, is also supplied to the device driver 371. The device driver also receives measured values, e.g., ambient light intensity information, from measuring device 106. The various input signals and information may be used by any one of the routines or sub-routines included in the device driver 371. The device driver 371 outputs the DDI/UPI information input thereto to the GDI for use by the GDI. The device driver also generates and outputs, to the display adapter 248, sets of luminous intensity values representing bitmapped images.

Color blending routine 2202 is responsible for applying foreground and background color selections to the data output by the GDI in LCD embodiments where the GDI generates bitmapped images represented by pixel sub-component blend coefficients, e.g., alpha values. Operation of the color blending routine 2202 will be described in the context of a system wherein one alpha value is generated per pixel sub-component.

Color blending routine 2202 first normalizes input alpha values, $\alpha_R$, $\alpha_G$, $\alpha_B$, to a range of 0–1. Foreground and background color selections, as indicated by foreground and background pixel sub-component luminous intensity values ($R_F$, $G_F$, $B_F$), ($R_B$, $G_B$, $B_B$) of a foreground and a background colored pixel, respectively, are then applied to generate output pixel sub-component luminous intensity values as follows:

$$R=(R_F\alpha_R)+R_B(1-\alpha_R)$$

$$G=(G_F\alpha_G)+G_B(1-\alpha_G)$$

$$B=(B_F\alpha_B)+B_B(1-\alpha_B).$$

The values R, G, B represent the RGB pixel sub-component luminous intensity values corresponding to a pixel, generated by color blending routine 2202.

Response correction routines 2204 receive the R, G, B pixel sub-component luminous intensity values output by color blending routine 2202 or the GDI 302, in embodiments where the GDI generates luminous intensity values as opposed to alpha values.

Unfortunately, due to a variety of factors the light output characteristics of a monitor tend to be non-linear and may vary widely from device to device due to age, manufacturing difference and a host of other factors. Complicating matters further is the fact that the position of the viewer relative to the screen can have in impact on the amount of light the viewer will perceive from different portions of the screen.

The luminous intensity values supplied to the response correction routines 2204 reflect desired output pixel sub-component luminous intensity values assuming a linear output (display) device. It is the responsibility of the response correction routines to compensate for the non-linear response characteristics of the actual display device. Thus, the purpose of the routines 2204 is to insure that the actual display output approximates the desired pixel sub-component luminous intensity levels indicated by the pixel sub-component luminous intensity values output by the GDI or color blending routine 2202.

Gamma correction is one technique for correcting luminous intensity values to take into consideration display device light output characteristics. Gamma correction sub-routine 2206 implements a gamma correction operation. If input on a user preferred gamma value is available, e.g., from the user profile information 354, the user preferred gamma value is used by sub-routine 2206. Alternatively, the gamma value stored in the display device profile 348, associated with the output display device 254, is used.

In accordance with the present invention, different gamma values may, and normally will, be used for LCD and CRT displays. In addition, different gamma values may be used for different LCD displays which are of the same model type and which are manufactured by the same display manufacturer As part of the gamma correction operation, the red, green and blue pixel sub-component luminous intensity values are normalized to a value between 0 and 1 to produce normalized, red, green and blue pixel sub-component luminous intensity levels $R_N$, $G_N$, $B_N$. They are then processed according to the following equation:

$$R_{NC}=R_N^{1/\gamma}$$
$$G_{NC}=G_N^{1/\gamma}$$
$$B_{NC}=B_N^{1/\gamma}$$

The normalized, corrected R, G, B pixel sub-component luminous intensity values, $R_{NC}$, $G_{NC}$, $B_{NC}$, respectively, are than converted back to luminous intensity values between the range of 0 and 255 by the gamma correction sub-routine and output to the viewing angle correction sub-routine 2208.

Viewing angle correction sub-routine 2208 uses viewing position information included in the user profile 348 to adjust luminous intensity values. As with the case of gamma correction, the processing performed by the viewing angle correction sub-routine is designed to adjust pixel sub-component luminous intensity values so that the perceived luminous intensity will approximate that specified by the pixel sub-component luminous intensity values output by the GDI 302 or color blending routine 2202.

The additional response correction sub-routine 2210 uses display device profile information such as the device's white point, gamut and/or method of light modulation and/or measured values such as ambient light intensity, to further adjust the pixel sub-component luminous intensity level values output by sub-routine 2208 so that that the perceived luminous intensity will approximate that specified by the pixel sub-component luminous intensity values output by the GDI 302 or color blending routine 2202. The additional response correction sub-routine may compensate for, e.g., degradation in the ability of a CRT display to output light as it ages.

The corrected pixel sub-component luminous intensity values generated by the additional response correction sub-routine 2210 are output to the display adapter 248. The display adapter 248 processes the received pixel sub-component luminous intensity values to put them in a format used to control the display device 254. In response to luminous intensity control signals received from the display adapter 248, the display device 254 displays the images, e.g., text, being rendered.

Through the use of the above discussed response correction routines, the output of the display device 254 can be adjusted so that the perceived images are of a higher quality than is possible in embodiments where such response correction operations are not performed.

In view of the description of the invention included herein, numerous additional embodiments and variations on the discussed embodiments of the present invention will be apparent to one of ordinary skill in the art. It is to be understood that such embodiments do not depart from the present invention and are to be considered within the scope of the invention.

What is claimed is:

1. In a computer system including a processing unit and a display device having a plurality of pixels, wherein the perceived quality of an image displayed on the display device may be affected by a variety of factors including i) physical attributes of the display device, for example type of display device, white point, pixel pattern, and/or method of light modulation, and ii) a user's ability to perceive the displayed image, for example human color sensitivity and/or viewing angle, and wherein the physical attributes tend to vary from one display device to another and the user's ability to perceive tends to vary front one user to another, a method of increasing the perceived quality of a displayed image by compensating for at least one physical attribute of a display device and user profile information, the method comprising the steps for:

storing information about the at least one physical attribute of said display device, wherein the step for storing the at least one physical attribute of said display device includes the act of storing display type information, the display type information indicating whether the display is a liquid crystal display, a cathode ray tube display or another type of display;

storing user profile information about at least one user's ability to perceive a displayed image on said display device;

using the stored physical attribute and user profile information to define at least one display device parameter;

when processing a representation of an image to be displayed on said display device, using the display device parameter to alter the output of one or more pixels of said display device in order to increase the perceived quality of the resulting image when displayed on the display device; and displaying the processed image on said display device.

2. The display method of claim 1, wherein the image is a character image and wherein said step for using the stored physical attribute information includes the act of:

scaling the representation of the character image as a function of the display type information.

3. The display method of claim 2, wherein said act of scaling the representation of the character image includes the act of:

selecting, based on the display type information, which one of a plurality of scaling methods should be used to scale the representation of the character image, the representation of the character image being scaled differently when the display type information indicates a liquid crystal display than when the display type information indicates a cathode ray tube display.

4. The display method of claim 1, wherein the step for storing information about at least one physical attribute of said display device includes the act of:

storing information about two physical attributes of the display device from the group of display attribute information consisting of: resolution information, pixel pattern information, light emitter shape information and method of light modulation information.

5. The display method of claim 4, wherein said step for using the stored physical attribute information includes the act of:

scaling a representation of a character image as a function of the stored information about the two physical attributes.

6. The display method of claim 5, wherein said step for using the stored physical attribute information further includes the act of:

performing a scan conversion operation as a function of the stored information about at least one of the two physical attributes.

7. The display method of claim 5, wherein said step for using the stored physical attribute information further includes the act of:

performing a hinting operation as a function of the stored information about at least one of the two physical attributes.

8. The display method of claim 1, wherein the step for storing information about at least one physical attribute of said display device includes the act of:

storing information about a physical attribute of the display device from the group of attribute information consisting of: gamma information, gamut information and white point information.

9. The display method of claim 1, wherein the step for storing information about at least one physical attribute of said display device further includes the act of:

storing information about a physical attribute of the display device from the group of display attributes consisting of: resolution information, pixel pattern information, light emitter shape information and method of light modulation information.

10. The method of claim 8, further comprising the step for:

measuring said physical attribute of the display device; and wherein the step for storing information includes the act of storing information obtained from said measuring step.

11. The method of claim 10, further comprising the step for:

periodically updating said stored attribute information.

12. The method of claim 11, wherein the step for periodically updating said stored attribute information includes the acts of:

estimating a change in a value included in said stored attribute information corresponding to estimated physical change in at least one physical display device attribute; and modifying the stored attribute information as a function of the estimated change in value.

13. The method of claim 11, wherein the step for periodically updating said stored attribute information includes the acts of:

periodically measuring said physical attribute of the display device; and modifying at least some of the stored attribute information so that it includes the most recently measured attribute information.

14. The method of claim 1, further comprising the steps for:

storing information about a user gamma value preference; and performing a gamma value correction operation on the data representing the image to be displayed using the stored user gamma value preference information.

15. The method of claim 1, further comprising the steps for:

storing information about a user's ability to perceive color; and performing a color filtering operation on the data representing the image to be displayed using said stored information about a user's ability to perceive color.

16. The method of claim 1, further comprising the steps for:

storing information about a preferred viewing position of a user; and performing a display response correction operation on the representation of the image as a function of the stored information about a preferred viewing position.

17. The method of claim 16, wherein the stored information about a preferred viewing position includes at least one of viewing angle and viewing distance information.

18. In a computer system including a processing unit and a display device having a plurality of pixels, wherein the perceived quality of an image displayed on the display device may be affected by a variety of factors including i) physical attributes of the display device, for example type of display device, white point, pixel pattern, and/or method of light modulation, and ii) a user's ability to perceive the displayed image, for example human color sensitivity and/or viewing angle, and wherein the physical attributes tend to vary from one display device to another and the user's ability to perceive tends to vary from one user to another, a method of increasing the perceived quality of a displayed image by compensating for at least one physical attribute of a display device and user profile information, the method comprising the steps for:

storing at least one physical attribute of said display device, and wherein the step for storing at least one physical attribute of said display device includes the act of storing display type information, the display type information indicating whether the display is a liquid crystal display, a cathode ray tube display or another type of display;

determining at least one light output characteristic of said display device;

storing display device light output characteristic information for said display device using a digital recording media;

determining user profile information about at least one user's ability to perceive a displayed image on said display device depending on the user's color sensitivity;

storing the user profile information for said user using a digital recording media;

supplying the stored physical attribute information, the light output characteristic information and the stored user profile information to a computer system coupled to said display device;

using the computer system to process the stored physical attribute, light output and user profile information in order to define at least one display device parameter;

when processing a representation of an image to be displayed on said display device, using the display device parameter to alter the output of one or more pixels of said display device in order to increase the perceived quality of the resulting image when displayed on the display device; and displaying the processed image on said display device.

19. The method of claim 18, wherein said light output characteristic of said display device includes at least one of the output characteristics from the group consisting of: gamut, white point and gamma characteristics.

20. The method of claim 19, wherein the step of determining at least one light output characteristic includes the act of:

using a measuring device to measure said light output characteristic of said display device.

21. The method of claim 20, further comprising the step for:

storing physical display device attribute information using said digital recording media, the physical display device attribute information including at least one of the physical display device attributes from the group consisting of resolution, display element shape and date of manufacture.

22. The method of claim 21, wherein said digital recording media is a magnetic disk; and wherein the step of storing physical display device attribute information includes the step of storing said display device attribute information on the magnetic disk.

23. The method of claim 21, wherein said digital recording media is non-volatile memory; and wherein the step of storing physical display device attribute information includes the step of storing said display device attribute information in the non-volatile memory.

24. The method of claim 20, further comprising the steps of:

periodically measuring said light output characteristic of said display device; and updating the stored information with said periodic light characteristic measurement.

25. The method of claim 20, further comprising the step of:

using said measuring device to measure ambient light conditions.

26. The method of claim 25, further comprising the steps of:

estimating a change in said at least one output characteristic as a function of time; and updating said stored display device light output characteristic information as a function the estimated change in said at least one output characteristic.

27. A computer program product for use in a computer system including a processing unit and a display device having a plurality of pixels, wherein the perceived quality of an image displayed on the display device may be affected by a variety of factors including i) physical attributes of the display device, for example type of display device, white point, pixel pattern, and/or method of light modulation, and ii) a user's ability to perceive the displayed image, for example human color sensitivity and/or viewing angle, and wherein the physical attributes tend to vary from one display device to another and the user's ability to perceive tends to vary from one user to another, the computer program product comprising a computer readable medium carrying computer executable instructions for implementing a method of increasing the perceived quality of a displayed image by compensating for at least one physical attribute of a display device and user profile information, the method comprising the steps for;

storing information about at least one physical attribute of said display device, wherein the step for storing at least one physical attribute of said display device includes the act of storing display type information, the display type information indicating whether the display is a liquid crystal display, a cathode ray tube display or another type of display;

storing user profile information about at least one user's ability to perceive a displayed image on said display device;

using the stored physical attribute and user profile information to define at least one display device parameter;

when processing a representation of an image to be displayed on said display device, using the display device parameter to alter the output of one or more pixels of said display device in order to increase the perceived quality of the resulting image when displayed on the display device; and displaying the processed image on said display device.

28. A computer program product as recited in claim 27, wherein the image is a character image and wherein said step for using the stored physical attribute information includes the act of scaling the representation of the character image as a function of the display type information.

29. A computer program product as recited in claim 28, wherein said act of scaling the representation of the character image includes the act of selecting, based on the display type information, which one of a plurality of scaling methods should be used to scale the representation of the character image, the representation of the character image being scaled differently when the display type information indicates a liquid crystal display than when the display type information indicates a cathode ray tube display.

30. A computer program product as recited in claim 27, wherein the step for storing information about at least one physical attribute of said display device includes the act of storing information about two physical attributes of the display device from the group of display attribute information consisting of: resolution information, pixel pattern information, light emitter shape information and method of light modulation information.

31. A computer program product as recited in claim 30, wherein said step for using the stored physical attribute information includes the act of sealing the representation of a character image as a function of the stored information about the at least two physical attributes.

32. A computer program product as recited in claim 31, wherein said step for using the stored physical attribute information further includes the act of performing a scan conversion operation as a function of the stored information about at least one of the two physical attributes.

33. A computer program product as recited in claim 31, wherein said step for using the stored physical attribute information further includes the act of performing a hinting operation as a function of the stored information about at least one or the two physical attributes.

34. A computer program product as recited in claim 27, wherein the step for storing information about at least one physical attribute of said display device includes the act of storing information about a physical attribute of the display device from the group of attribute information consisting of: gamma information, gamut information and white point information.

35. A computer program product as recited in claim 34, wherein the step for storing information about at least one physical attribute of said display device further includes the act of storing information about a physical attribute of the display device from the group of display attributes consisting of: resolution information, pixel pattern information, light emitter shape information and method of light modulation information.

36. A computer program product as recited in claim 34, wherein the method further comprises the step for measuring said physical attribute of the display device, and wherein the step for storing information includes the act of storing information obtained from said measuring step.

37. A computer program product as recited in claim 36, the method further comprising the step for periodically updating said stored attribute information.

38. A computer program product as recited in claim 37, wherein the step for periodically updating said stored attribute information includes the acts of:

estimating a change in a value included in said stored attribute information corresponding to estimated physical change in at least one physical display device attribute; and modifying the stored attribute information as a function of the estimated change in value.

39. A computer program product as recited in claim 37, wherein the step for periodically updating said stored attribute information includes the acts of:

periodically measuring said physical attribute of the display device; and modifying at least some of the stored attribute information so that it includes the most recently measured attribute information.

40. A computer program product as recited in claim 27, the method further comprising the steps for:

storing information about a user gamma value preference; and performing a gamma value correction operation on the data representing the image to be displayed using the stored user gamma value preference information.

41. A computer program product as recited in claim 27, the method further comprising the steps for:

storing information about a user's ability to perceive color; and performing a color filtering operation on the data representing the image to be displayed using said stored information about a user's ability to perceive color.

42. A computer program product as recited in claim 27, the method further comprising the steps for:

storing information about a preferred viewing position of a user; and performing a display response correction operation on the representation of the image as a function of the stored information about a preferred viewing position.

43. A computer program product as recited in claim 42, wherein the stored information about a preferred viewing position includes at least one of viewing angle and viewing distance information.

44. A computer program product for use in a computer system including a processing unit and a display device having a plurality of pixels, wherein the perceived quality of an image displayed on the display device may be affected by a variety of factors including i) physical attributes of the display device, for example type of display device, white point, pixel pattern, and/or method of light modulation, and ii) a user's ability to perceive the displayed image, for example human color sensitivity and/or viewing angle, and wherein the physical attributes tend to vary from one display device to another and the user's ability to perceive tends to vary from one user to another, the computer program product comprising a computer readable medium carrying computer executable instructions for implementing a method of increasing the perceived quality of a displayed image by compensating for at least one physical attribute of a display device and user profile information, the method comprising the steps for:

storing at least one physical attribute of said display device, and wherein the step for storing at least one physical attribute of said display device includes the act of storing display type information, the display type information indicating whether the display is a liquid crystal display, a cathode ray tube display or another type of display;

determining at least one light output characteristic of said display device;

storing display device light output characteristic information for said display device using a digital recording media;

determining user profile information about at least one user's ability to perceive a displayed image on said display device depending on the user's color sensitivity;

storing the user profile information for said user using a digital recording media;

supplying the stored physical attribute information, the light output characteristic information and the stored user profile information to a computer system coupled to said display device;

using the computer system to process the stored physical attribute, light output and user profile information in order to define at least one display device parameter;

when processing a representation of an image to be displayed on said display device, using the display device parameter to alter the output of one or more pixels of said display device in order to increase the perceived quality of the resulting image when displayed on the display device; and displaying the processed image on said display device.

45. A computer program product as recited in claim 44, wherein said light output characteristic of said display device includes at least one of the output characteristics from the group consisting of gamut, white point and gamma characteristics.

46. A computer program product as recited in claim 45, wherein the step for determining at least one light output characteristic includes the act of using a measuring device to measure said light output characteristic of said display device.

47. A computer program product as recited in claim 46, the method further comprising the step for storing physical display device attribute information using said digital recording media, the pixel pattern information including at least one of the physical display device attributes from the group consisting of pixel pattern, resolution, display element shape and date of manufacture.

48. A computer program product as recited in claim 47, wherein said digital recording media is a magnetic disk, and wherein the step for storing physical display device attribute information includes the step for storing said display device attribute information on the magnetic disk.

49. A computer program product as recited in claim 47, wherein said digital recording media is non-volatile memory, and wherein the step for storing physical display device attribute information includes the step for storing said display device attribute information in the non-volatile memory.

50. A computer program product as recited in claim 46, the method further comprising the steps for:

periodically measuring said light output characteristic of said display device; and updating the stored information with said periodic light characteristic measurement.

51. A computer program product as recited in claim 46, the method further comprising the step for using said measuring device to measure ambient light conditions.

52. A computer program product as recited in claim 51, the method further comprising the steps for:

estimating a change in said at least one output characteristic as a function of time; and updating said stored display device light output characteristic information as a function of the estimated change in said at least one output characteristic.

* * * * *